(12) United States Patent
Yoshida et al.

(10) Patent No.: US 6,714,505 B2
(45) Date of Patent: Mar. 30, 2004

(54) DISK DEVICE WITH WIDTH-VARYING MECHANISM

(75) Inventors: Mitsunobu Yoshida, Tenri (JP); Masanobu Furukawa, Nara (JP); Kyoji Kasuga, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/337,273

(22) Filed: Jan. 6, 2003

(65) Prior Publication Data

US 2003/0128462 A1 Jul. 10, 2003

(30) Foreign Application Priority Data

Jan. 7, 2002 (JP) ........................................ 2002-000657

(51) Int. Cl.$^7$ .............................................. G11B 33/02
(52) U.S. Cl. ...................................................... 369/77.2
(58) Field of Search ........................... 369/30.43, 30.45, 369/30.46, 30.48, 30.55, 126, 30.32, 30.94, 77.2, 77.1; 360/99.02, 99.06, 99.01, 97.01, 88

(56) References Cited

U.S. PATENT DOCUMENTS

| | | | | |
|---|---|---|---|---|
| 5,402,283 A | * | 3/1995 | Yamakawa et al. ........... 360/92 |
| 5,450,391 A | * | 9/1995 | Pollard ........................ 369/191 |
| 5,691,859 A | * | 11/1997 | Ulrich et al. .................. 360/92 |
| 5,737,293 A | * | 4/1998 | Kawamura et al. ......... 369/77.1 |
| 6,236,530 B1 | * | 5/2001 | Schneider et al. ............. 360/92 |
| 6,288,982 B1 | * | 9/2001 | Kato ....................... 369/30.36 |
| 6,385,003 B1 | * | 5/2002 | Ellis ............................ 360/92 |
| 6,424,603 B1 | * | 7/2002 | Matsushima ............. 369/30.42 |

* cited by examiner

*Primary Examiner*—Julie Anne Watko
(74) *Attorney, Agent, or Firm*—David G. Conlin; William J. Daley, Jr.; Edwards & Angell, LLP

(57) ABSTRACT

Side holders 52, 52 are provided at either side in the width direction interior relative to stationary holder(s). Parallel link mechanism(s) is or are provided for causing side holders 52, 52 to move in the cartridge 40 width direction. When a cartridge 40 which is one of a plurality of types of cartridge other than a cartridge or cartridges of the type or types that is or are smallest in width is inserted therein, pressure from that inserted cartridge 40 causes actuation of parallel link mechanism(s), and respective side holders 52, 52 move outward in coupled fashion to form insertion space in agreement with width direction dimension(s) of cartridge 40.

43 Claims, 23 Drawing Sheets

DISK DEVICE WITH WIDTH-VARYING MECHANISM

2. BACKGROUND OF INVENTION

1. Field of Invention

The present invention relates to a disk device for carrying out recording of information onto and/or retrieval of information from a recording medium (hereinafter "cartridge") wherein an optical disk or magnetic disk is contained within a disk case. In particular, the present invention relates to an improvement for providing a disk device capable of accommodating a plurality of types of cartridge of different size.

2. Conventional Art

Cartridges, as represented by minidisks and the like, are conventionally loaded into a special-purpose disk device (also called a drive), whereupon recording of information onto a magneto-optical disk and/or retrieval of information therefrom may be carried out. Disk devices are described in general below.

FIGS. 27(a)–(c) are drawings showing a typical conventional disk device, where FIG. 27(a) is a plan view thereof, FIG. 27(b) is a side view thereof, and FIG. 27(c) is a bottom view thereof. As shown in these drawings, such a disk device is such that a cartridge holder 26 is attached above a base chassis 3, constituting an outer shell. Furthermore, this cartridge holder 26 is supported by base chassis 3 so as to permit rotary motion within a prescribed angular range about pivot point(s) 27.

The procedure for loading cartridge 2 into the disk device is therefore such that, with cartridge holder 26 first rotated and raised above base chassis 3, cartridge 2 is then inserted into cartridge holder 26 from below FIG. 27(a). Cartridge holder 26 is thereafter rotated toward base chassis 3 (i.e., downward) to complete loading of cartridge 2 in the disk device.

Furthermore, disposed at the approximate center of base chassis 3 is spindle motor 4, magneto-optical disk 1 being chucked thereon by means of a hub attached to a spindle motor shaft which protrudes above base chassis 3. During recording of information onto magneto-optical disk 1 and/or retrieval of information therefrom, spindle motor 4 drives a magneto-optical disk 1 which is chucked thereon, causing magneto-optical disk 1 to rotate at prescribed speed.

Respectively arranged at opposing locations so as to sandwich therebetween magneto-optical disk 1 which is thus inserted therein are pickup unit 7 and magnetic head 12.

Pickup unit 7 is constructed such that laser light emitted from laser light source 8 is reflected by a mirror 9 or a prism so as to irradiate the surface(s) of magneto-optical disk 1 from direction(s) perpendicular with respect thereto, such reflected laser light being collected at recording layer(s) on magneto-optical disk 1 by objective lens 11.

Furthermore, presence of slide mechanism 15 makes it possible for this pickup unit 7 to slide radially across magneto-optical disk 1 (to the left and/or right as shown in FIG. 27(c)). Secured to base chassis 3 there is a guide shaft 19 which extends perpendicularly with respect to the axis of the spindle motor shaft, pickup unit 7 being guided by this guide shaft 19 as it moves in sliding fashion as a result of driving of slide mechanism 15.

The slide mechanism 15 is equipped with feed motor 16, transmission mechanism 17, and feed screw 18. Driving of feed motor 16 causes motive power therefrom to be transmitted to transmission mechanism 17, causing rotation of feed screw 18. In addition, pickup unit 7 is engaged by this feed screw 18, pickup unit 7 being constructed such that rotation of this feed screw 18 causes it to slide parallel to guide shaft 19 and radially with respect to magneto-optical disk 1.

Attached to pickup unit 7 there is a grip spring 20. Provided at the tip of this grip spring 20 is a projection, not shown, shaped so as to permit backlash-free engagement with feed screw 18. The entirety of grip spring 20 displays spring characteristics, and it is secured such that the aforementioned projection is pressed on by feed screw 18. This allows pickup unit 7 to slide radially across magneto-optical disk 1 without backlash during rotation of feed screw 18.

Moreover, magnetic head 12 is constructed such that a coil is inserted therein so as to capture a core formed in integral fashion from ferrite. This magnetic head 12 is attached to suspension member 13 which displays spring characteristics so as to apply load(s) in direction(s) perpendicular to the surface(s) of magneto-optical disk 1. This suspension member 13 is secured to head attachment bracket 14. This head attachment bracket 14 is secured to housing 10 of pickup unit 7 so as to cause magnetic head 12 and the spot of light collected by objective lens 11 to be located at prescribed positions. This allows magnetic head 12, which is secured to housing 10, to slide in linked fashion with and in the same direction as pickup unit 7 when pickup unit 7 is made to slide radially across magneto-optical disk 1 by slide mechanism 15.

Magnetic head 12 is held by a restoring force against the disk surface during recording of information onto magneto-optical disk 1, and is made to move in a direction taking it away from the disk surface by a magnetic head elevator mechanism during playback or retrieval of information therefrom.

This magnetic head elevator mechanism is equipped with head elevator motor 23 which is arranged underneath base chassis 3, reduction mechanism 25, rotary lever 24 which receives driving power from head elevator motor 23 by way of reduction mechanism 25, and head elevator lever 21 which is rotatably disposed between suspension member 13 and cartridge 2. That is, when this magnetic head elevator mechanism is driven, rotary power from head elevator motor 23 is first transmitted from reduction mechanism 25 to rotary lever 24. Furthermore, rotary lever 24 causes head elevator lever 21 to rotate, causing suspension member 13 and magnetic head 12 to back off to prescribed distances from magneto-optical disk 1. While head elevator lever 21 is ordinarily located above cartridge 2, the drive components that cause operation of head elevator lever 21 are underneath base chassis 3, rotation of head elevator lever 21 being permitted as a result of coupling between top and bottom occurring by virtue of rotary lever 24 at a region peripheral to cartridge 2.

During recording of information onto the aforementioned magneto-optical disk 1, spindle motor 4 causes magneto-optical disk 1 to rotate at prescribed speed, and the magnetic head elevator mechanism causes magnetic head 12 to be lowered, whereupon suspension member 13 causes it to be held by a restoring force against the disk surface. By moreover causing laser light from pickup unit 7 to be made incident on a recording layer formed at magneto-optical disk 1, regions within the recording layer which receive the incident laser light increase in temperature due to the laser light thereat and undergo a change in magnetization in correspondence to the direction of an external magnetic field. Employment of the so-called magnetic field modulation method, in which an external magnetic field is varied in correspondence to a recording signal, permits areas of inverted magnetization direction to be formed with a prescribed pattern in the recording layer, making it possible to write information thereat. Furthermore, recording is sequentially carried out as slide mechanism 15 causes pickup unit 7 to move radially across magneto-optical disk 1.

Moreover, during playback of information from magneto-optical disk 1, the magnetic head elevator mechanism causes suspension member 13 and magnetic head 12 to back off to prescribed distances from magneto-optical disk 1. Once in this state, laser light is used to read information therefrom. Furthermore, similar to the situation occurring during recording of information as described above, playback is sequentially carried out as slide mechanism 15 causes pickup unit 7 to move radially across magneto-optical disk 1.

Such conventional disk devices have thus ordinarily been intended for cartridges of only a single type with respect to size, and disk devices intended to accommodate two or more types of cartridge have not ordinarily been available.

Art making it possible for the same disk device to carry out recording of information onto and/or retrieval of information from two or more types of cartridge is for example disclosed at Japanese Patent Application Publication Kokai No. H13-6210 (2001). This publication proposes use of an adapter for making the dimensions of a small cartridge agree with those of a large cartridge in order to make it possible for two types of cartridge, one small and one large, to be loaded into a disk device. That is, an adapter having dimensions matching those of the large cartridge is prepared, loading of the small cartridge into the disk device being made possible as a result of insertion thereof in the adapter.

Furthermore, Japanese Patent Application Publication Kokai No. H10-11853 (1998) proposes a structure wherein a disk device is provided with a cover insert for use with small cartridges, this cover insert serving as guide during insertion of small cartridges.

Moreover, Japanese Patent Application Publication Kokai No. H9-120614 (1997) proposes a disk device capable of accommodating floppy disk cartridges of different size. To wit, a floppy disk device is proposed that relates to floppy disk devices permitting selective insertion of a second disk cartridge, the lateral width of which is greater than that of a first disk cartridge, the floppy disk device being equipped with positioning means which, when a first disk cartridge is inserted therein, guides both sides of the first disk cartridge in the direction of insertion of said first disk cartridge so as to retain it, and which, when a second disk cartridge is inserted therein, guides the second disk cartridge and delivers a restoring force to the second disk cartridge so as to retain it.

The art disclosed in the aforementioned respective publications has the problems listed below.

First, addressing the disclosure at Japanese Patent Application Publication Kokai No. H13-6210 (2001), during use of the small cartridge it is necessary to carry out a procedure wherein this small cartridge is inserted into an adapter, making this unsatisfactory from the standpoint of ease of operation.

Furthermore, addressing the disclosure at Japanese Patent Application Publication Kokai No. H10-11853 (1998), because the small cartridge is guided only by the cover region, there is no guarantee that it will be possible to load the small cartridge such that it assumes a prescribed position within the device, making for poor reliability. Furthermore, when inserting the large cartridge, it is necessary to carry out a procedure wherein the cover insert is rotated to a position such as will prevent interference with the large cartridge before the large cartridge can be inserted therein, making this unsatisfactory from the standpoint of ease of operation in this respect as well.

In addition, addressing the disclosure at Japanese Patent Application Publication Kokai No. H9-120614 (1997), while a restoring force from a plate spring is employed as mechanism for varying the width of a cartridge holder so as to permit accommodation of a plurality of types of cartridge, it is difficult to accomplish accurate cartridge positioning with this restoring force alone, which represents a problem from the standpoint of reliability. Furthermore, because it is merely the width of the cartridge holder that is made variable, it is possible that a cartridge having specifications for which the disk device is not intended to be used (i.e., a nonstandard cartridge) might be accidentally inserted therein, in which case it is possible that this could lead to damage of the internal mechanism of the device.

3. SUMMARY OF INVENTION

The present invention was conceived in light of the foregoing problems and has as its object the provision of a disk device that is capable of accommodating cartridges of different size and that is capable of accurately positioning such cartridges.

A means employed by one or more embodiments of the present invention for achieving the foregoing object is predicated first upon a disk device having an insertion space for insertion of one or more cartridges, the insertion space or spaces being capable of accepting insertion of a plurality of types of cartridge of different size. Such disk device may be equipped with at least one pair of holding members, one at the left and one at the right, each possessing at least one retractable mechanism capable of moving in at least one insertion space width direction, this width direction being more or less perpendicular to a direction of insertion of at least one of the cartridge or cartridges, and with one or more width-varying mechanisms which, when at least one of the plurality of types of cartridge other than a cartridge or cartridges of the type or types that is or are smallest in width is or are inserted therein, causes or cause the left and the right members of at least one of the pair or pairs of holding members to move in linked fashion in the insertion space width direction in correspondence to at least one width direction dimension of at least one of the cartridge or cartridges being inserted therein.

Such specific features permit attainment of a disk device capable of accommodating cartridges of different size, and moreover, because respective left and right holding members operate in linked fashion in the insertion space width direction in correspondence to at least one cartridge width direction dimension, such cartridge can be inserted into such insertion space with accurate positioning of same.

The following may be presented as examples of specific constructions for width-varying mechanism(s). First, at least one of the width-varying mechanism or mechanisms may be equipped with at least one pair of retractable means, one at the left and one at the right, disposed in correspondence to at least two of the respective holding members, and with at least one pair of drive mechanisms, one at the left and one at the right, each of which is capable of being pressed on by and receiving at least one pressing force from at least a region at or near the front of the inserted end of at least one of the cartridge or cartridges when it or they is or are inserted therein. Furthermore, at least one of the drive mechanism or mechanisms which is located at one side of the width direction of the insertion space may be coupled by one or more coupling means to at least one of the retractable means which is located at the other side thereof, and at least one of the drive mechanism or mechanisms which is located at the other side thereof may be coupled by one or more coupling means to at least one of the retractable means which is located at the one side thereof.

Furthermore, one or more stationary holders which is or are capable of retaining at least one of the width-varying mechanisms may be provided, and at least one of the retractable mechanisms may constitute a parallel link mechanism which is such that respective members of at least one of the pair or pairs of holding members are mutually coupled by two or more parallel linking members, at least two of the linking members being rotatably supported at their approximate centers by at least one of the stationary holder or holders. Furthermore, at least one of the width-varying mechanism or mechanisms may be equipped with at least one pair of left and right drive mechanisms, each of which is such that one end thereof is rotatably supported by at least one of the stationary holder or holders and the other end thereof is provided with one or more functional regions capable of being pressed on by at least a region at or near the front end of at least one of the cartridge or cartridges when at least one of the plurality of types of cartridge other than a cartridge or cartridges of the type or types that is or are smallest in width is or are inserted therein. Furthermore, a construction may be adopted wherein at least one of the pair or pairs of left and right holding members is each provided with one or more stepped regions extending in the insertion space width direction, and at least one of the functional region or regions is capable of causing at least one width dimension between at least two of the holding members to be made variable as a result of transmission of at least one force from at least one of the cartridge or cartridges to at least one of the stepped region or regions.

Moreover, at least one of the holding members and at least one of the retractable means may constitute at least two independent parallel link mechanisms, one for each the left and the right members of at least one of the pair or pairs of holding members, capable of causing at least one of the holding members to move in the insertion space width direction when at least one of the cartridge or cartridges is inserted therein.

Constituting width-varying mechanism(s) in this way permits attainment of width-varying mechanism(s) of comparatively simple construction and requiring little in the way of space for installation thereof.

Furthermore, at least one of the width-varying mechanism or mechanisms may be constructed such that at least one dimension in the insertion space width direction formed by at least two of the holding members when no cartridge is inserted therein more or less agrees with the width of the cartridge or cartridges of the type or types that is or are smallest in width among the plurality of types of cartridge. Similarly, at least one of the width-varying mechanism or mechanisms may be constructed such that at least one dimension mutually separating the left and the right members of at least one of the pair or pairs of drive mechanisms when no cartridge is inserted therein more or less agrees with the width of the cartridge or cartridges of the type or types that is or are smallest in width among the plurality of types of cartridge.

Such specific features make it possible to carry out a procedure whereby the cartridge or cartridges of the type or types that is or are smallest in width among the plurality of types of cartridge may be inserted without actuation of width-varying mechanism(s). That is, with such a width-varying mechanism still in its initial state, it is possible to accurately position such a cartridge that is smallest in width when it is inserted into an insertion space.

The following may be presented as examples of constructions for preventing faulty operation during insertion of cartridge(s). That is, such a disk device may be equipped with one or more blocking mechanisms, at least one of which is capable of blocking operation of at least one of the width-varying mechanism or mechanisms in the event that only one drive mechanism of at least one pair of drive mechanisms is pressed on by at least a region at or near the front of the inserted end of at least one of the cartridge or cartridges.

At least one of such blocking mechanism or mechanisms may be provided at one or more regions at which at least one of the drive mechanisms, at least one of the retractable means, and at least one of the coupling means are coupled to each other. Furthermore, one or more of such region or regions at which at least one of the retractable means and at least one of the coupling means are coupled to each other may also serve as region or regions at which at least one of the retractable means and at least one of the holding members are coupled to each other.

As a result of provision of such blocking mechanism(s), actuation of width-varying mechanism(s) will not occur and cartridge insertion will not be possible when a cartridge is accidentally inserted such that only the drive mechanism(s) on one side is or are pressed on by the cartridge. That is, because width-varying mechanism(s) will not actuate unless the cartridge is accurately positioned during insertion, it is possible to prevent faulty operation during cartridge insertion.

At least one of such blocking mechanism or mechanisms may be constructed so as to permit one or more blocking levers actuated by at least one of the cartridge or cartridges during the course of abnormal insertion of the cartridge or cartridges to block operation of at least one of the drive mechanisms. Furthermore, at least one of the blocking mechanism or mechanisms may be constructed such that when at least one of the cartridge or cartridges is inserted therein with actuation occurring by virtue of a manually driven operation, actuation of at least one of the width-varying mechanism or mechanisms is blocked when the manually driven operation is overridden.

This permits actuation of such blocking mechanism(s) during mid-insertion even where an attempt at insertion is made with blocking mechanism(s) having been overridden through human intervention at the start of the insertion procedure, making it possible to prevent faulty insertion under such circumstances as well.

Furthermore, one or more restoring force delivery means may be provided which is or are capable of delivering one or more restoring forces in at least a direction tending to cause a decrease in at least one dimension mutually separating the left and the right members of at least one of the pair or pairs of holding members. This makes it possible for restoring force(s) from restoring force delivery means to cause dimension(s) mutually separating holding members to be made smallest when no cartridge is inserted therein. This makes it possible to accurately position a cartridge—e.g., one that is smallest in width as described above—when it is inserted into an insertion space.

A construction may be adopted wherein one or more stepped regions extending outward in the insertion space width direction is or are formed on at least one of the holding members at or near the open end of the insertion space, and wherein one or more reactive forces from at least one of the stepped region or regions acts or act on at least one of the drive mechanisms when operation of at least one of the width-varying mechanism or mechanisms causes at least one of the holding members to move outward in the insertion space width direction and at least one of the drive mechanisms presses on at least one of the stepped region or regions. In such a case, at least one dimension of at least one step at at least one of the stepped region or regions formed on at least one of the holding members may be smaller than at least one corresponding dimension of at least one of the drive mechanism or mechanisms which is captured by the at least one stepped region.

Such construction makes it possible for the insertion procedure to be carried out with satisfactory attainment of force(s) for retention of cartridge(s) due to presence of reactive force(s) acting on drive mechanism(s) from stepped region(s). This also permits satisfactory positioning of cartridge(s) during insertion of same.

One or more free-turning rollers may be provided at one or more locations at at least one of the drive mechanisms where it or they is or are pressed on by at least one of the cartridge or cartridges. Doing so will permit such roller(s) to roll along edge(s) of cartridge(s) when cartridge(s) is or are inserted therein, permitting reduction in load during insertion and improving the insertion procedure from the standpoint of ease of operation.

Furthermore, such a disk device may be constructed such that at least one of the stationary holder or holders which is capable of retaining at least one of the width-varying mechanisms is supported by one or more base chasses so as to permit rotary motion, and such that access is provided to the insertion space, making it possible to carry out insertion of at least one of the cartridge or cartridges, when at least one of the stationary holder or holders is in a prescribed angular position.

In addition, such a disk device may be such that at least one of the plurality of types of cartridge is such that disk diameter is approximately 60 mm or greater, at least another of the plurality of types of cartridge is such that disk diameter is less than approximately 60 mm, at least this one type and this other type are portable-type cartridges, and the disk device is capable of accommodating these disks.

4. BRIEF DESCRIPTION OF DRAWINGS

Figure 27A:
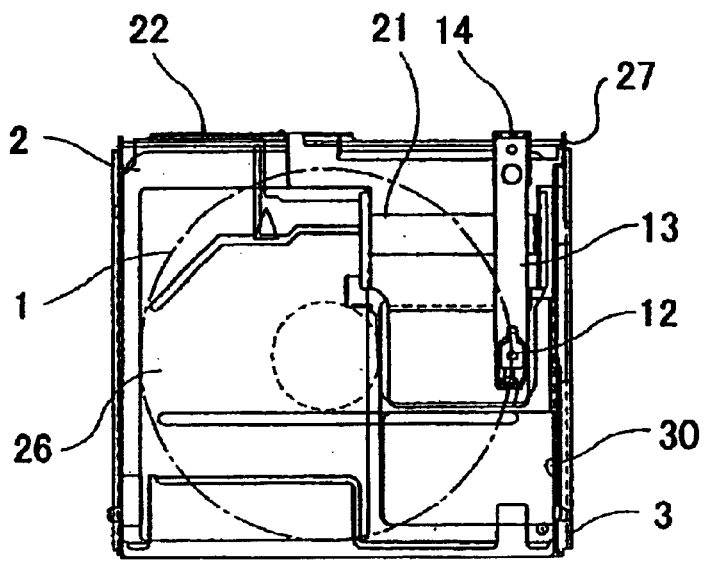
Figure 27B:
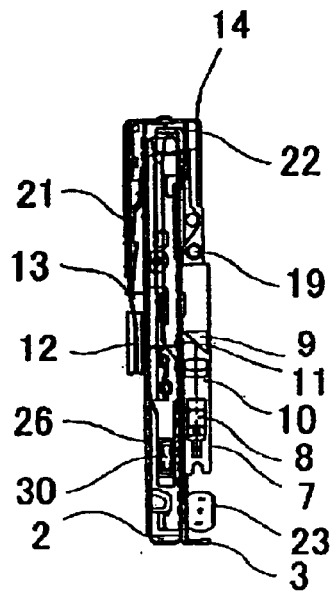
Figure 27C:
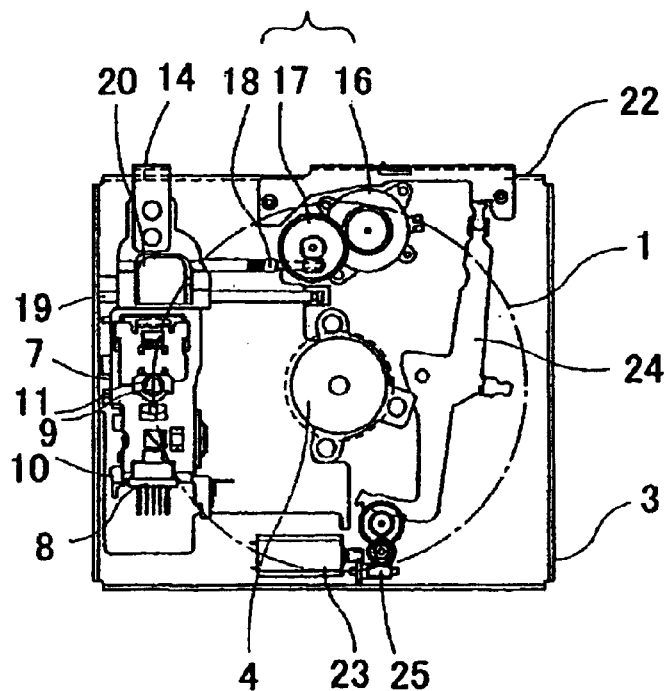

FIGS. 27(*a*)–(*c*) are various views of a conventional disk device; FIG. 27(*a*) being a plan view, FIG. 27(*b*) being a side view and FIG. 27(*c*) being a bottom view.

5. DESCRIPTION OF PREFERRED EMBODIMENTS

Below, embodiments of the present invention are described with reference to the drawings. In the embodiments that follow, the present invention is described in terms of an example in which it is applied to a magneto-optical disk recording and playback device. Furthermore, the distinctive feature of the present invention lies in the fact that a magneto-optical disk recording and playback device is equipped with a mechanism capable of accommodating a plurality of types of cartridge of different size, the constitution thereof being otherwise similar to the conventional art described with reference to the foregoing FIGS. 27(*a*)–(*c*). Accordingly, in the embodiments that follow, elements identical to those in the aforementioned conventional art will be given reference numerals identical to those used in FIGS. 27(*a*)–(*c*) and description thereof will be omitted.

Embodiment 1

Figure 1:
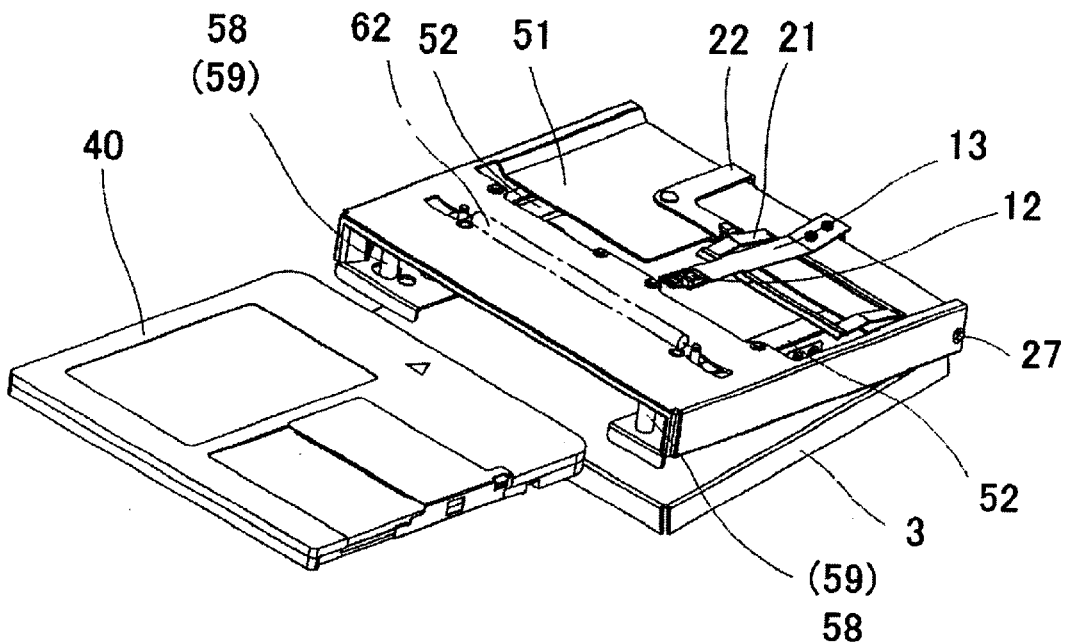
FIG. 1 is an oblique view showing a first embodiment of the present invention as it exists during insertion of a large cartridge.
Figure 2:
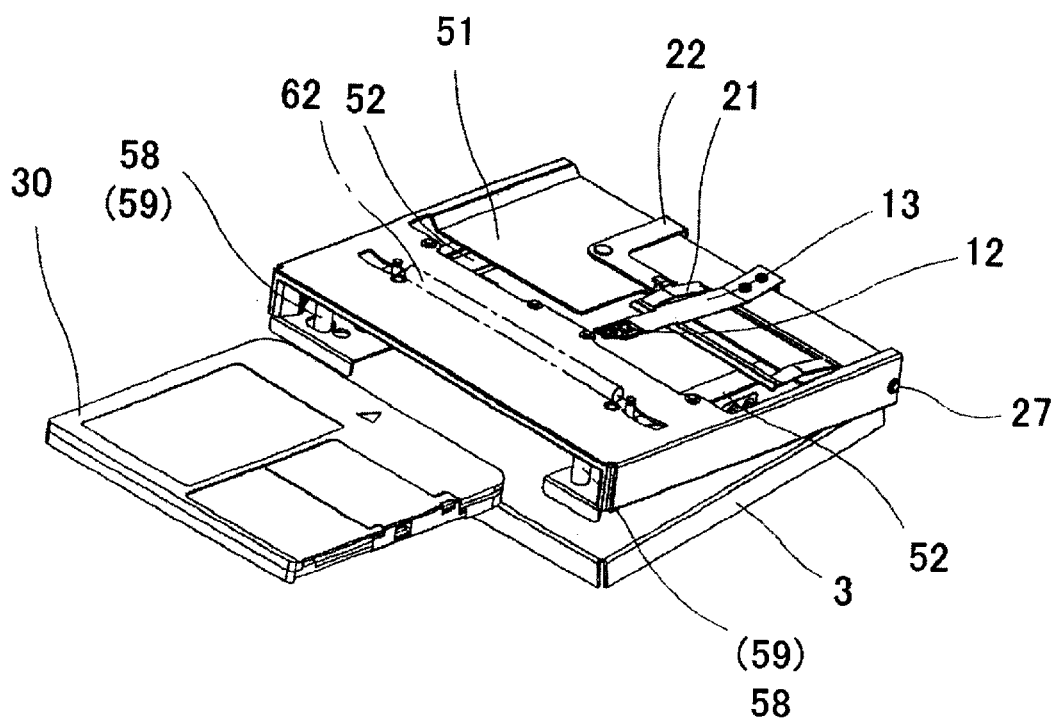
FIG. 2 is an oblique view showing a first embodiment of the present invention as it exists during insertion of a small cartridge.
Figure 3A:
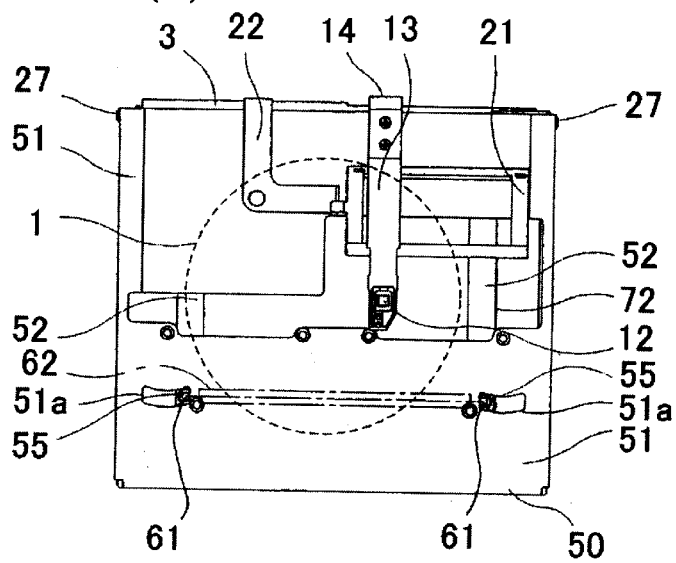
FIG. 3(*a*) is a plan view of a disk device in accordance with the present invention, FIG. 3(*b*) is a side view thereof, and FIG. 3(*c*) is a bottom view thereof.
Figure 3B:
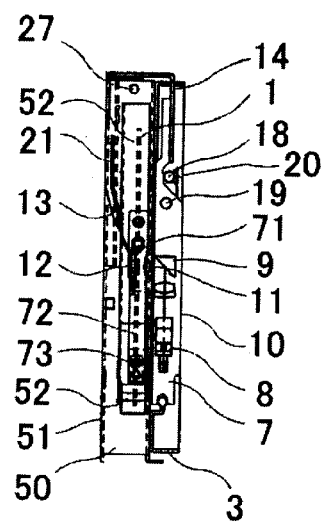
Figure 3C:
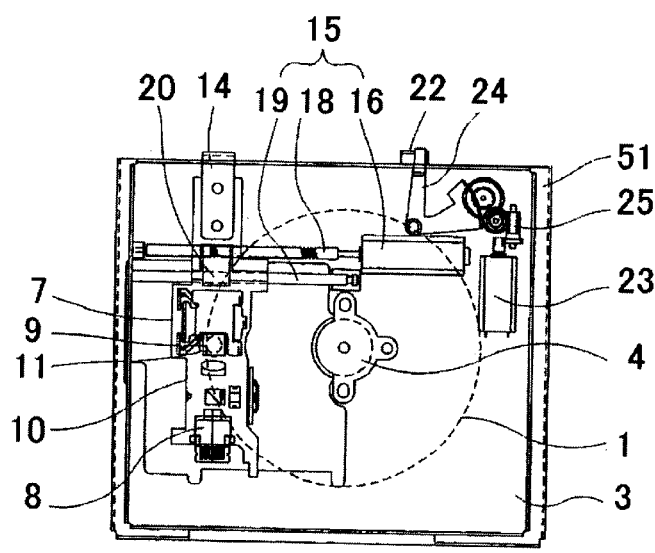
Figure 4:
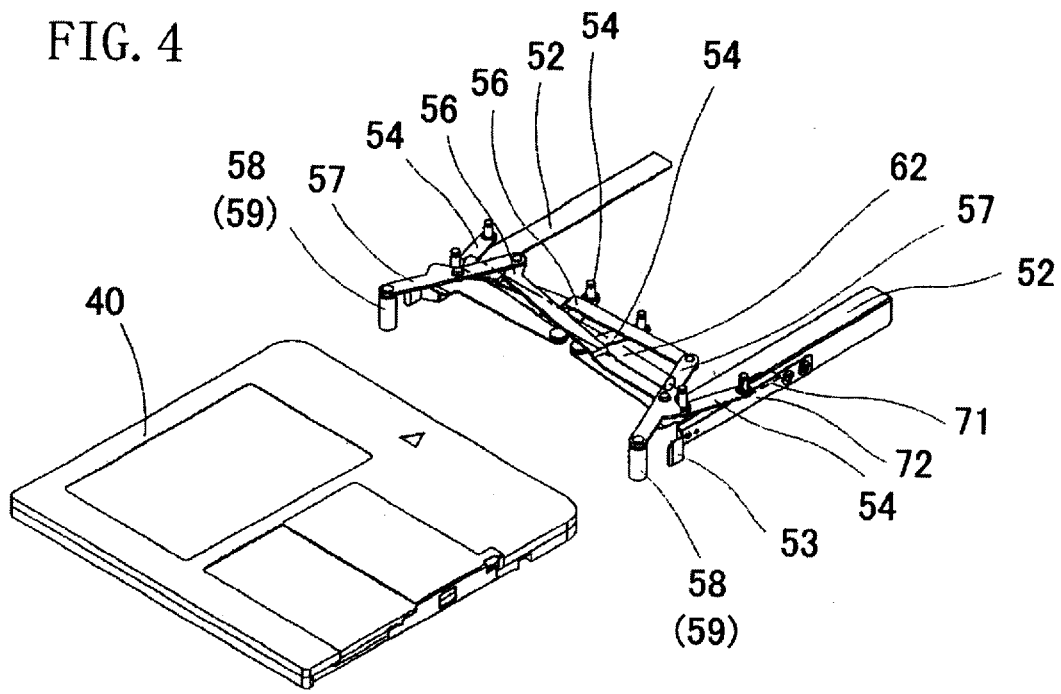
FIG. 4 is an oblique view showing the internal mechanism of the device when in the state shown at FIG. 1.
Figure 5:
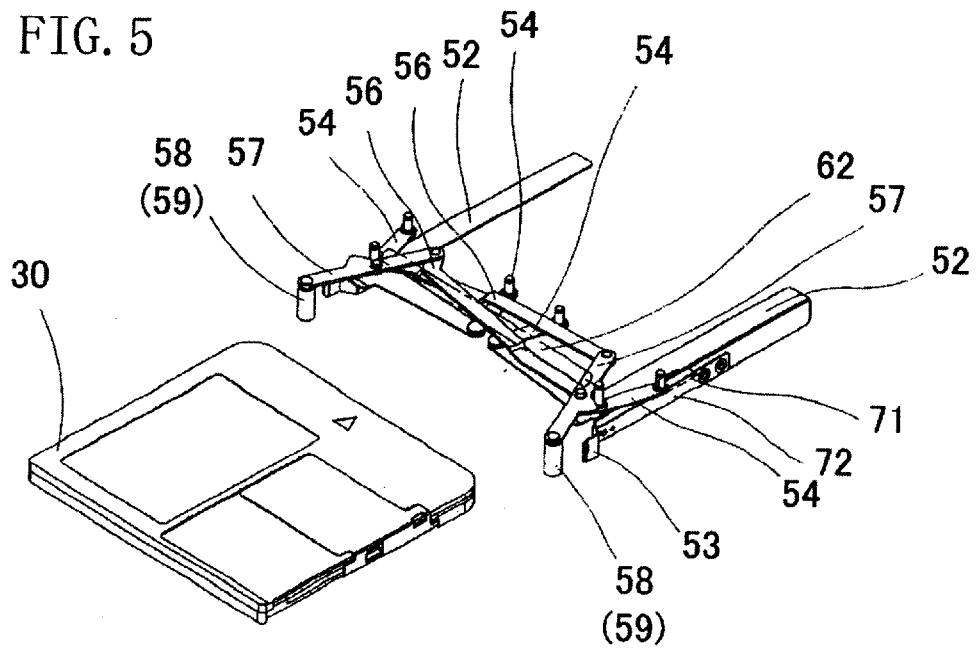
FIG. 5 is an oblique view showing the internal mechanism of the device when in the state shown at FIG. 2.

A first embodiment of the present invention will first be described. FIG. 1 is a drawing of a magneto-optical disk recording and playback device (hereinafter referred to simply as "disk device") equipped with a variable cartridge holder 50 associated with the present embodiment as shown during insertion of a large cartridge 40, FIG. 2 being a drawing of the same disk device as shown during insertion of a small cartridge 30. Furthermore, FIG. 3(*a*) is a plan view of the disk device, FIG. 3(*b*) is a side view of the disk device, and FIG. 3(*c*) is a bottom view of the disk device. In addition, FIG. 4 is an oblique view showing the internal mechanism of the device when in the state shown at FIG. 1, and FIG. 5 is an oblique view showing the internal mechanism of the device when in the state shown at FIG. 2.

As shown in these respective drawings, the present disk device is equipped with a mechanism permitting accommodation of a plurality of types of cartridge 30, 40 of different size. This mechanism is described below.

This variable cartridge holder 50 is equipped with stationary holder(s) 51 corresponding to region(s) at which cartridge(s) 30, 40 is or are inserted. Such stationary holder 51 is or are formed in box-like fashion, an opening for insertion of cartridge(s) 30, 40 being formed at the front thereof, and the left and right sides thereof being more or less C-shaped. Furthermore, the width of such stationary holder 51 is chosen so as to be larger than the maximum corresponding dimension among plurality of types of cartridges 30, 40 by an amount sufficient to allow space for operation of side holder(s) 52 which serve as holding member(s) and which will be described below. Furthermore, the height of such stationary holder 51 is chosen so as to be large enough to accommodate installation of side holder(s) 52 and width-varying mechanism(s), to be described below.

Side holders 52, 52, formed with more or less L-shaped cross-section, are respectively arranged at the left and right sides (i.e., at either side of the insertion space width direction, which direction is perpendicular to what is referred to in the context of the present invention as the cartridge insertion direction) at the interior of stationary holder 51, space for insertion of cartridge(s) being formed between these respective side holders 52, 52. Respective side holders 52, 52 are respectively coupled at their top surfaces to stationary holder 51 by way of link arm(s) 54 serving as retractable means. Link arms 54 are each rotatably supported by stationary holder 51 at one end and by a side holder 52 at the other end so as to constitute a parallel link mechanism capable of extension and/or retraction (note that the term "retractable" as used herein generally refers to ability to carry out both extension and retraction) in a lateral direction (i.e., to the left and/or right in FIG. 3(*a*)). The other wall of each side holder 52 (i.e., the wall extending vertically in the drawing) is formed by the outer edge of that side holder 52 and is capable of being moved in correspondence to size(s) of cartridge(s) 30, 40 as a result of driving of width-varying mechanism(s) (described in detail below).

Furthermore, provided at side holder 52 shown at right in the drawing are lock release member(s) 71 for releasing lock(s) on shutter(s) 31, 41 during insertion of cartridge(s) 30, 40, and shutter retaining member(s) 72 for retaining shutter(s) 31, 41.

Moreover, at the front portion of variable cartridge holder 50, drive arm(s) 57, serving as drive mechanism(s) and having functional region(s) 58 which is or are capable of being pressed on by at least a region at or near the front edge of large cartridge 40, is or are pivotably secured to stationary holder(s) 51. Functional region(s) 58 is or are constituted by free-turning roller(s) 59 which is or are capable of turning freely. During insertion of large cartridge 40, edge(s) of such large cartridge 40 press on functional region(s) 58, rolling of such functional region(s) 58 permitting reduction in load during insertion.

Coupled to each drive arm 57, at the side thereof opposite to functional region 58 from the pivot point, is one end of coupling arm(s) 56 serving as coupling means The other end of each such coupling arm 56 is coupled to link arm(s) 54. Furthermore, one of the coupling arms 56 couples the drive arm 57 shown at left in the drawing to the link arm 54 shown at right in the drawing, and the other coupling arms 56 couples the drive arm 57 shown at right in the drawing to the link arm 54 shown at left in the drawing.

Restoring force delivery means 62, capable of delivering restoring force(s) in at least a direction tending to cause the two side holders 52 to approach one another (i.e., in at least a direction tending to decrease the distance therebetween), spans or span respective link arms 54. The disk device therefore assumes a state such that the distance between left and right free-turning rollers 59 matches the size of the smallest cartridge 30 when no cartridge 30, 40 is inserted therein. When small cartridge 30 is inserted therein with the disk device in this state, left and right free-turning rollers 59 will be able to guide small cartridge 30. The distance between free-turning rollers 59, 59 thus initially matches the size of small cartridge 30; however, upon insertion of large cartridge 40, free-turning rollers 59, 59 are pushed and spread apart against restoring force(s) from restoring force delivery means 62, as a result of which space for accommodating insertion of large cartridge 40 is created.

Furthermore, as guide in the cartridge thickness direction, stationary holder 51 supports the bottom of the cartridge, while pressure-applying spring(s) (not shown) provided at side holder(s) 52 presses or press on the top of the cartridge from above so as to retain it. A construction is therefore adopted such that the dimension(s) of stationary holder 51 and side holder(s) 52 in the cartridge thickness direction is or are sufficient to accommodate insertion of the largest cartridge 40, displacement of the foregoing pressure-applying spring(s) which press on the cartridge 30, 40 when it is loaded in the device providing the compliance necessary to accommodate insertion of small cartridge 30.

Figure 6:
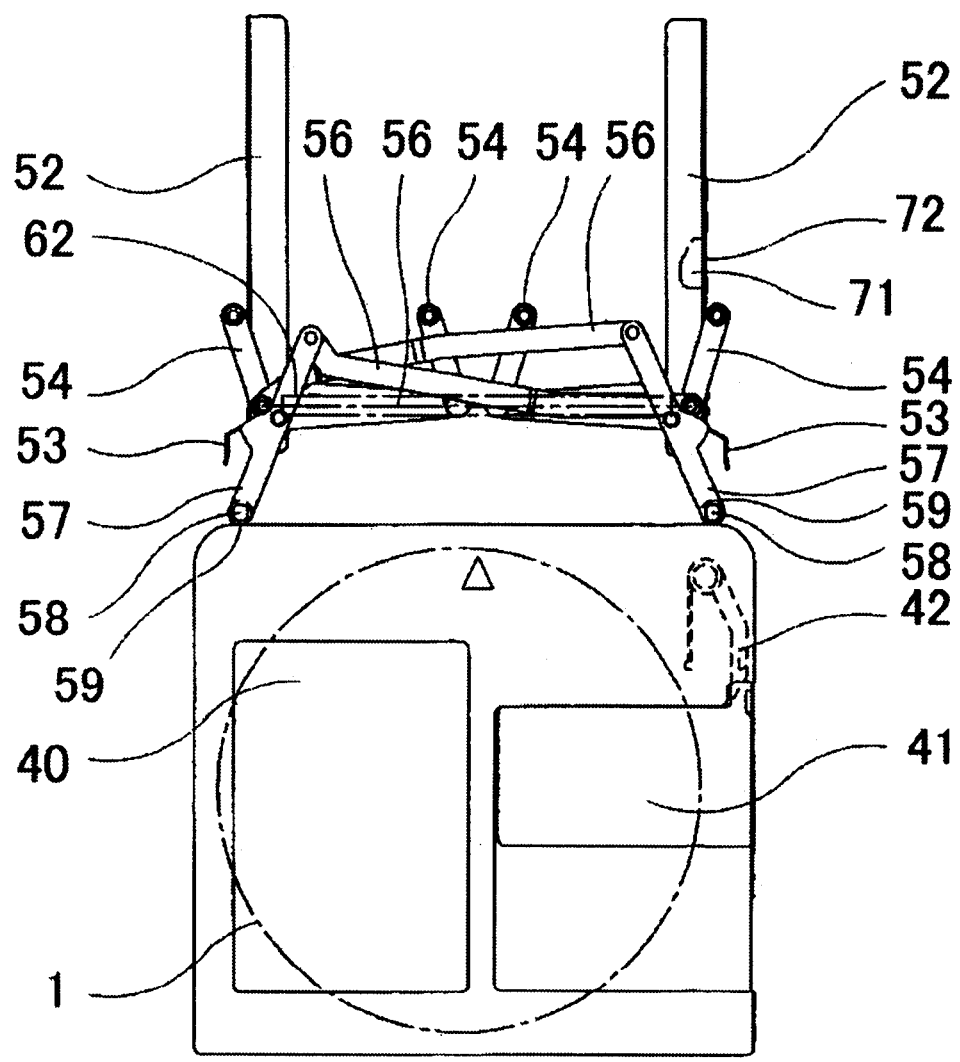
FIG. 6 is a drawing showing the front edge of a large cartridge as it presses on free-turning rollers at functional regions.
Figure 7:
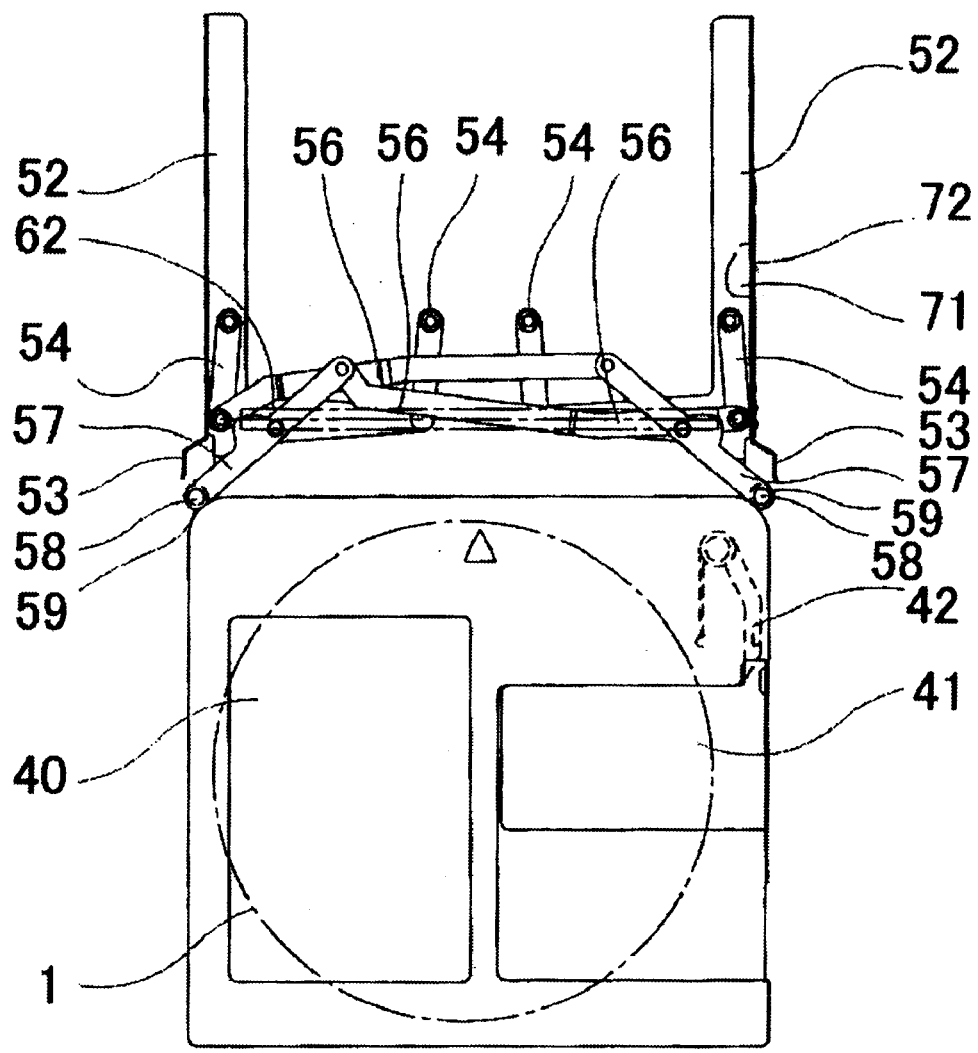
FIG. 7 is a drawing showing the front edge of a large cartridge as it pushes on free-turning rollers at functional regions.
Figure 8:
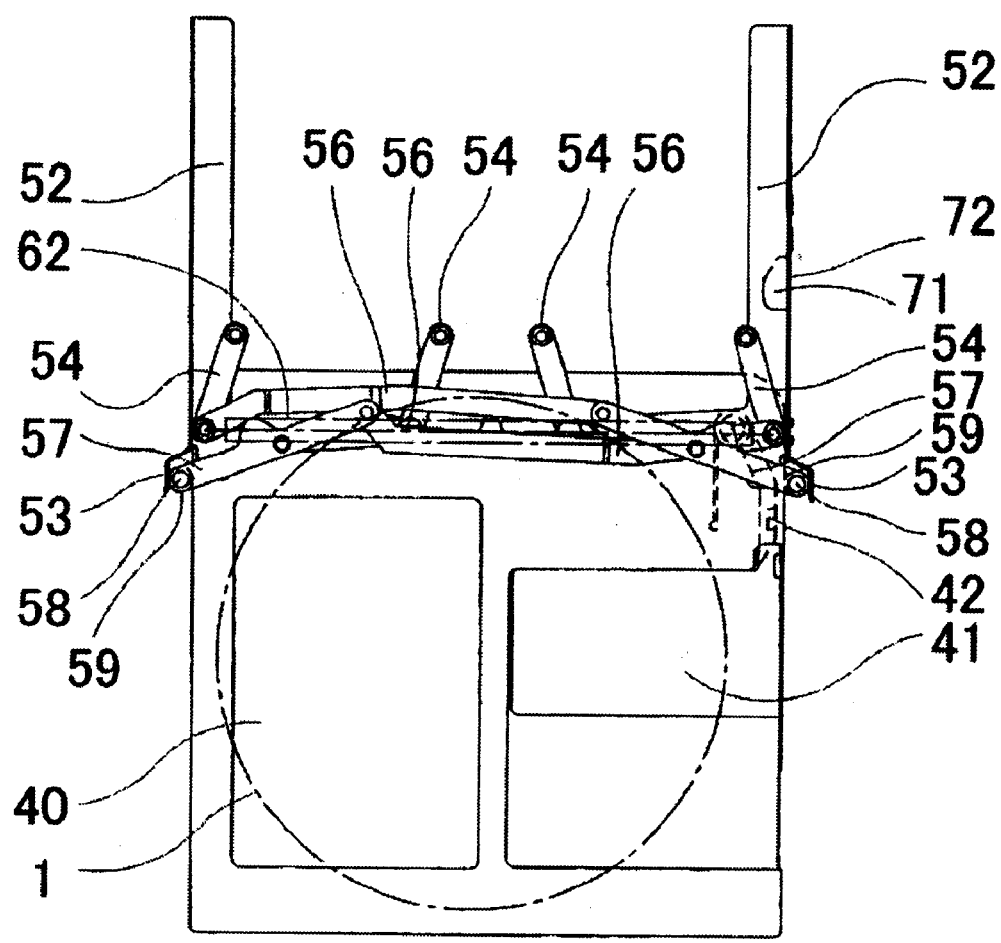
FIG. 8 is a drawing showing free-turning rollers as they slide along the sides of a cartridge.
Figure 12:
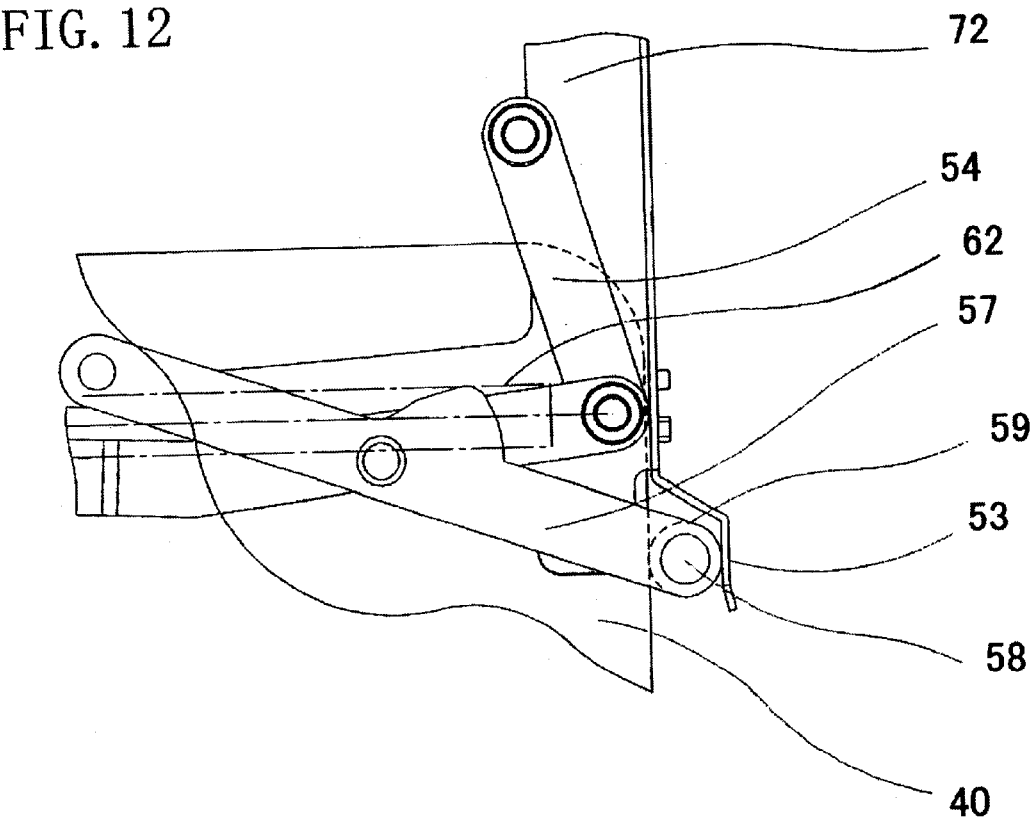
FIG. 12 is a drawing showing a free-turning roller captured by a side holder step.

Referring to FIGS. 6 through 8, operation during insertion of large cartridge 40 will now be described. FIG. 6 shows the front edge of large cartridge 40 as it presses on free-turning rollers 59 at functional regions 58. With the device in this state, continuing to push large cartridge 40 into the device causes free-turning rollers 59 to roll and slide along the front edge of large cartridge 40 and simultaneously causes side holders 52, 52 to open to the left and right (see FIG. 7). In addition, when the distance between respective side holders 52, 52 is equivalent to the size of large cartridge 40, free-turning rollers 59 slide along the cartridge sides (see FIG. 8) and movement of side holders 52, 52 (i.e., the operation causing increase in the distance therebetween) stops. At this time, free-turning rollers 59 are captured by side holder steps 53 which serve as stepped regions and which are provided on side holders 52 to the front in the cartridge insertion direction, and free-turning rollers 59 press on side holders 52. The size(s) of the step(s) at these side holder steps 53 is or are chosen to be somewhat smaller than the diameter(s) of free-turning rollers 59. Side pressure from restoring force delivery means 62 urging side holders 52, 52 to move in a direction such as will decrease the distance therebetween therefore acts on the side surfaces of large cartridge 40, being transmitted thereto from side holder steps 53 by way of free-turning rollers 59, so that large cartridge 40 does not directly receive side pressure from side holders 52 (see enlarged view at FIG. 12).

Figure 9:
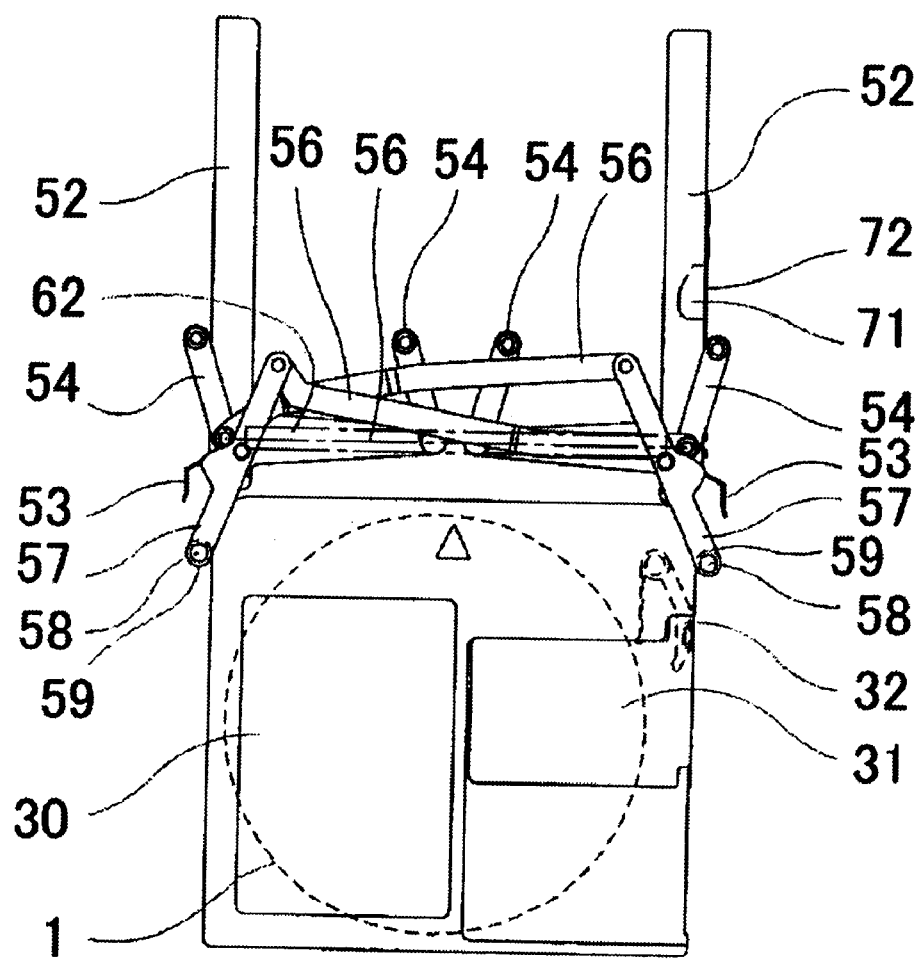
FIG. 9 is a drawing for assisting in describing operation during insertion of a small cartridge.
Figure 10:
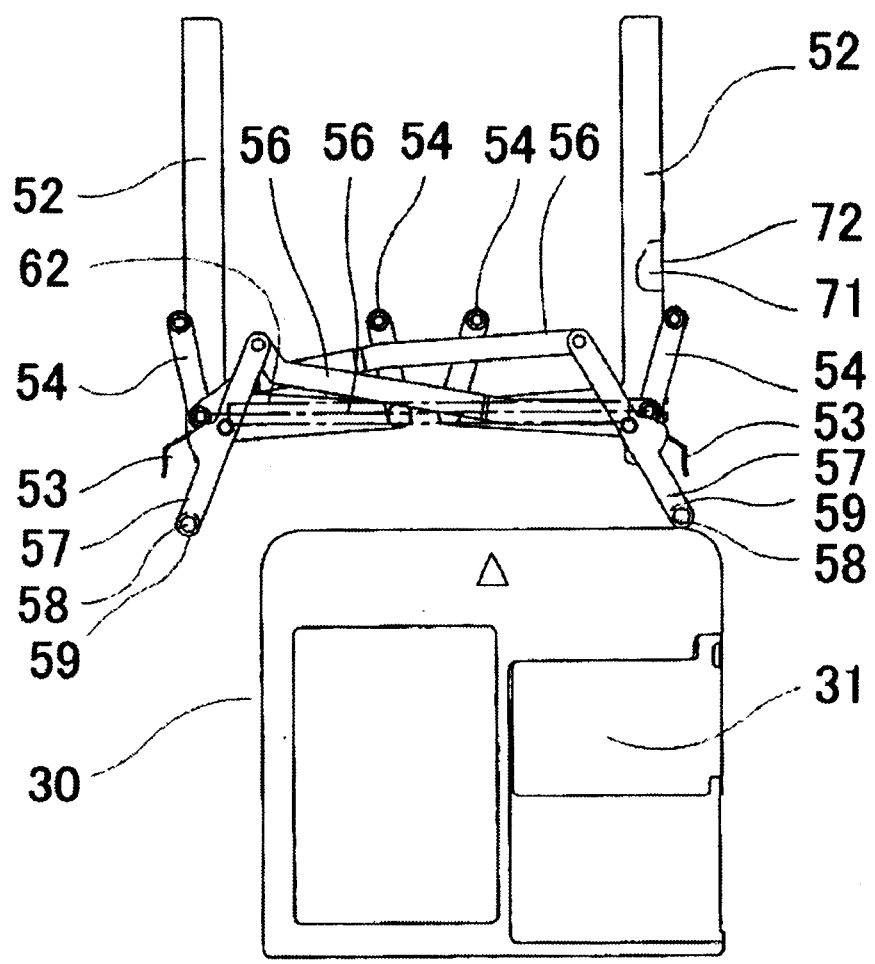
FIG. 10 is a drawing showing only the free-turning roller at one side being pushed on by a small cartridge.

Moreover, when small cartridge 30 is inserted therein, because the foregoing free-turning rollers 59 will have come to rest at positions such that the distance therebetween more or less corresponds to the size of small cartridge 30, with the device in that state it is enough to simply insert small cartridge 30 therein such that it is aligned with the space between free-turning rollers 59, 59 (see FIG. 9). At this time, in the event of occurrence of a situation in which small cartridge 30 pushes on only the free-turning roller 59 at one side or the other (i.e., a situation as shown in FIG. 10), a blocking mechanism such is described below operates to permit blocking of insertion.

Figure 11:
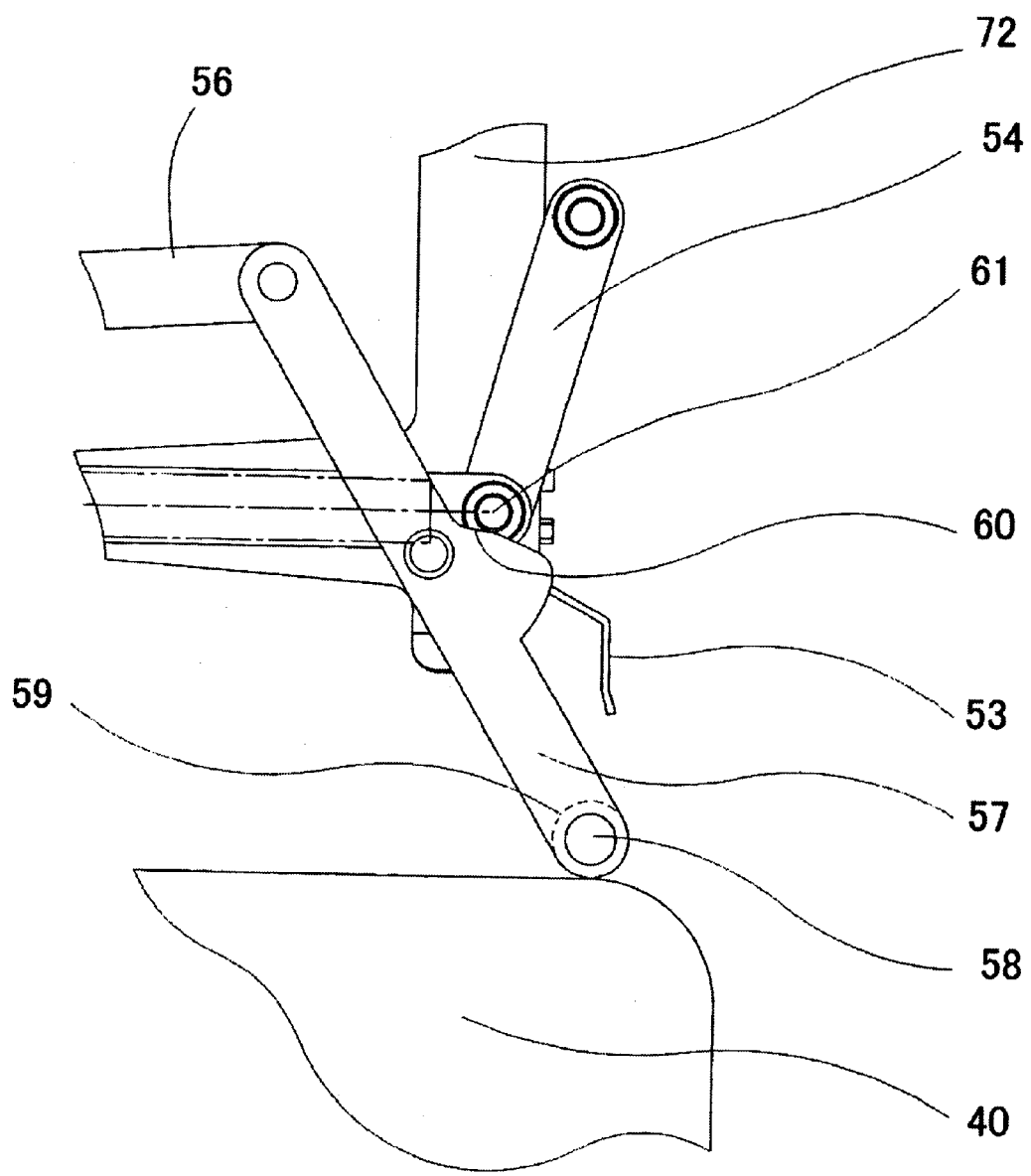
FIG. 11 is a drawing for assisting in describing actuation of a blocking mechanism.

Next, the aforementioned blocking mechanism is described in detail. Blocking mechanism(s) may be provided where drive arm(s) 57, coupling arm(s) 56, and link arm(s) 54 are coupled to each other. Such blocking mechanism(s) does not or do not operate when both left and right functional regions 58 are simultaneously driven (i.e., when a cartridge simultaneously pushes on left and right functional regions 58); but in the event of occurrence of a situation in which, for example taking the case shown in FIG. 10, only the functional region 58 shown at right in the drawing is driven, such blocking mechanism(s) does or do operate so as to prevent actuation of parallel link mechanism(s). More specifically, under the circumstances shown in FIG. 10, because a construction is adopted wherein, as described above, right-side side holder 52 and link arm 54 are driven by left-side drive arm 57, right-side blocking pin 61 will, as shown in FIG. 11, not operate (blocking pin 61 will not move). With the device in that state, the construction adopted is such that even if further attempt is made to rotate and drive this drive arm 57, blocking region 60 will abut and be blocked by blocking pin 61, with the result that actuation is prevented when only right-side drive arm 57 is driven. That is, because a construction is permitted which is such that it is only when left and right functional regions 58, 58 are made to operate simultaneously that blocking mechanism(s) does not or do not operate, faulty insertion will not occur despite accidental off-center insertion of a cartridge.

While the blocking mechanism(s) in the present embodiment is or are such that blocking action occurs between blocking pin(s) 61 and blocking region(s) 60 of drive arm(s) 57, reduction in the number of parts employed is achieved as a result of the fact that a single multi-purpose pin—this or these blocking pin(s) 61—is or are made to serve as stopper, respectively abutting the edge(s) of and stopping movement of slot(s) 51a (see FIG. 3) provided on stationary holder(s) 51 during movement thereof in a direction tending to cause contraction of side holder(s) 52, spring catch(es) for installation of restoring force delivery means 62 delivering restoring force(s) in a direction tending to cause contraction of side holder(s) 52, region(s) at which link arm(s) 54 and coupling arm(s) 56 are coupled to each other, and region(s) at which link arm(s) 54 and side holder(s) 52 are coupled to each other. Needless to say, such blocking mechanism(s) is or are not limited to this or these location(s).

Operation in connection with opening and closing of shutter(s) when cartridge 30, 40 is inserted in stationary holder 51 will now be described. When cartridge 30, 40 is inserted with stationary holder 51 pivoted so as to be above base chassis 3, shutter retaining member protrusion(s) (not shown) provided at the tip(s) of shutter retaining member(s) 72—which displays or display spring characteristics, which is or are for opening and closing shutter(s), and which is or are provided at side holder(s) 52—is or are raised onto vertical region(s) of such shutter(s) 31, 41, causing such shutter vertical region(s) to move. In addition, lock release member(s) 71 provided at side holder(s) 52 releases or release lock lever(s), not shown, following which the foregoing lock release member(s) 71 abuts or abut shutter(s) 31, 41, and simultaneously therewith, the foregoing shutter retaining member protrusion(s) at shutter retaining member(s) 72, due to the spring force thereof, is or are captured by shutter opening(s) provided at shutter vertical region(s) of shutter(s) 31, 41, and shutter(s) 31, 41 is or are retained at prescribed location(s) on cartridge holder(s) 50. Thereafter, action tending to push cartridge 30, 40 therein causes such cartridge body to be inserted more deeply thereinto, but because shutter(s) 31, 41 is or are held at that or those location(s), this results in relative movement such that shutter(s) 31, 41 is or are opened.

During closing of shutter(s) 31, 41, because the foregoing shutter retaining member protrusion(s) is or are captured by shutter opening(s) of shutter(s) 31, 41, shutter(s) 31, 41 is or are held at that or those location(s) as cartridge 30, 40 is withdrawn therefrom in a direction opposite the insertion direction, and when shutter(s) 31, 41 reaches or reach the closed position of cartridge 30, 40, lock release member(s) 71 recedes or recede from shutter(s) 31, 41, shutter(s) 31, 41 is or are locked by lock lever(s), shutter retaining member protrusion(s) is or are raised from shutter opening(s) of shutter(s) 31, 41, following which the entire cartridge 30, 40 may be withdrawn from cartridge holder 50.

Moreover, stationary holder 51 is pivotably supported at pivot point(s) 27 of base chassis 3, being supported so as to allow it to swing above the device and such that cartridge 30, 40 may be loaded thereinto from a point above the device. That is, a construction is adopted such that the cartridge loading device is of the so-called kangaroo-pocket type, such as is frequently employed in portable equipment and the like.

During removal of cartridge 30, 40, an ejection mechanism (not shown) is used to discharge cartridge 30, 40. Following removal of large cartridge 40, force(s) from the foregoing restoring force delivery means 62 cause side holder(s) 52 and functional region(s) 58 to return to their original states.

For example, in the present case the diameter of the disk contained within large cartridge 40 might be approximately 64 mm and the diameter of the disk at small cartridge 30 might be approximately 50 mm, permitting employment as a portable device suitable for video movies or other such extended-duration recording applications and easily permitting compatibility with dedicated small cartridge 30 devices.

While the present invention has been described above in terms of a magneto-optical disk device permitting application in the context of cartridges of a plurality of sizes, application thereof is also possible in the context of floppy disks, optical disks, and the like having large and small cartridges.

Embodiment 2

A second embodiment of the present invention will now be described. The constitution of the width-varying mechanism(s) in the present embodiment is different from that of the foregoing first embodiment, but the constitution of the present embodiment is in other respects more or less identical thereto. Accordingly, description here will be confined to the width-varying mechanism(s).

Figure 13:
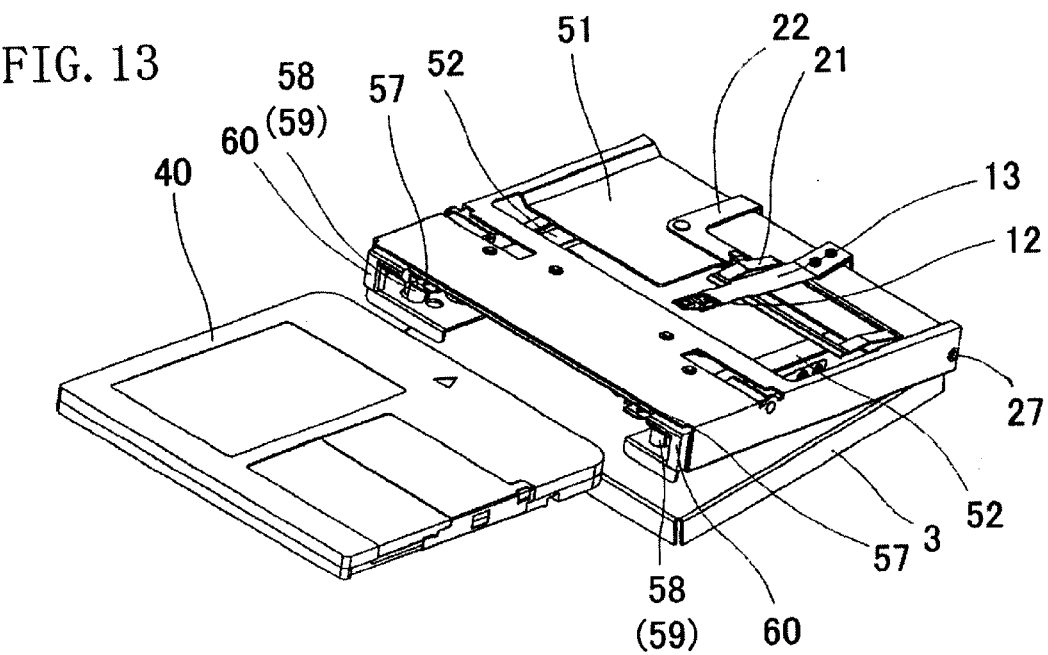
FIG. 13 is a drawing corresponding to FIG. 1 but showing instead a second embodiment of the present invention.
Figure 14:
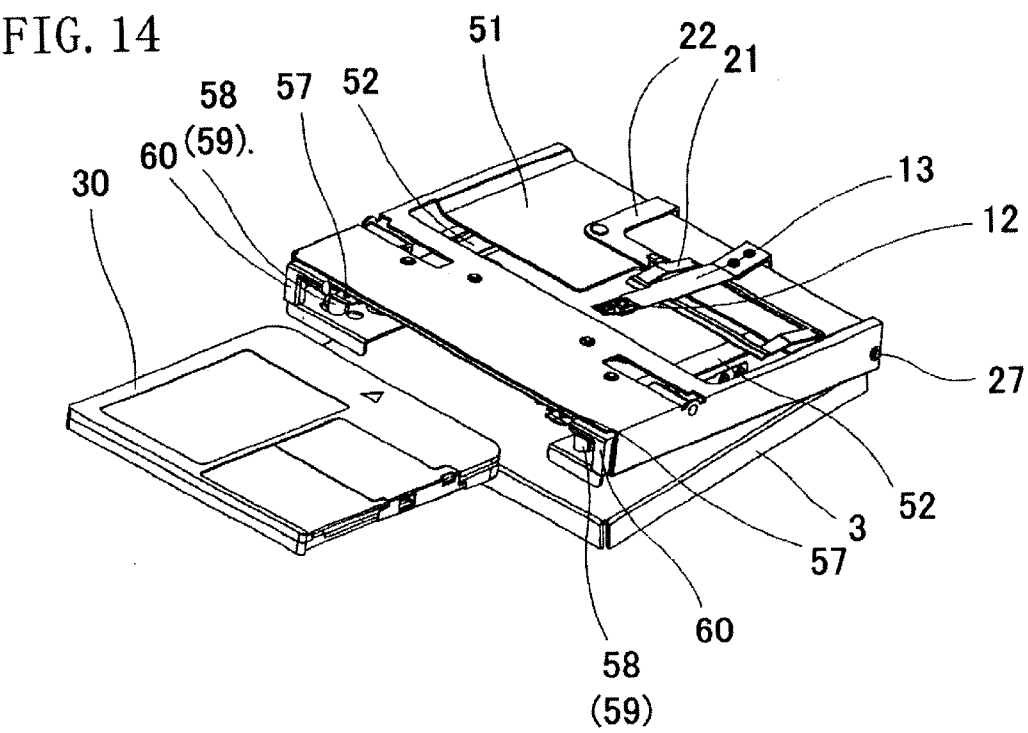
FIG. 14 is a drawing corresponding to FIG. 2 but showing instead a second embodiment of the present invention.

FIG. 13 is a drawing of a disk device equipped with a variable cartridge holder 50 associated with the present embodiment as it exists during insertion of large cartridge 40, and FIG. 14 is a drawing of this disk device as it exists during insertion of small cartridge 30. Furthermore, FIG.

Figure 15A:
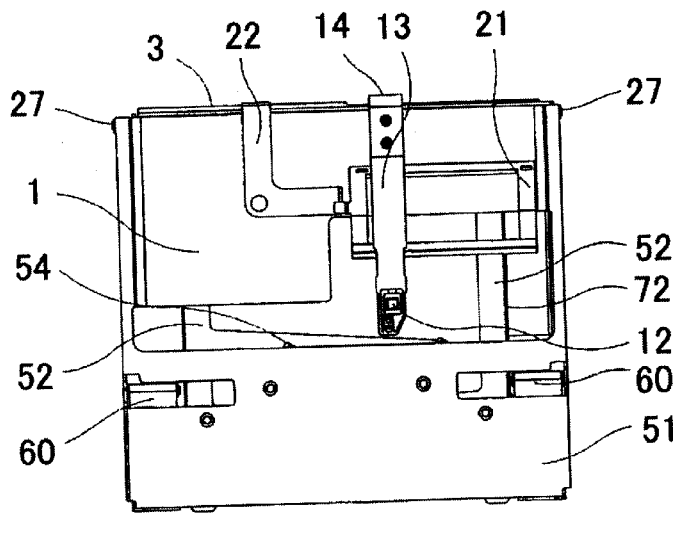
FIG. 15 is a drawing corresponding to FIG. 3 but showing instead a second embodiment of the present invention.
Figure 15B:
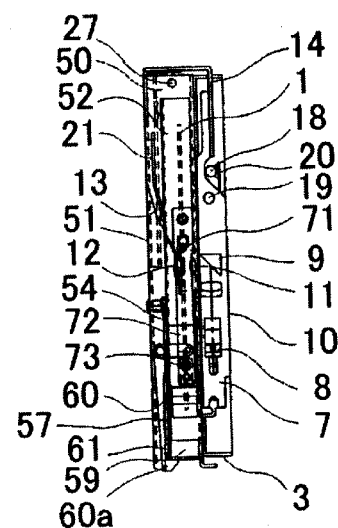
Figure 15C:
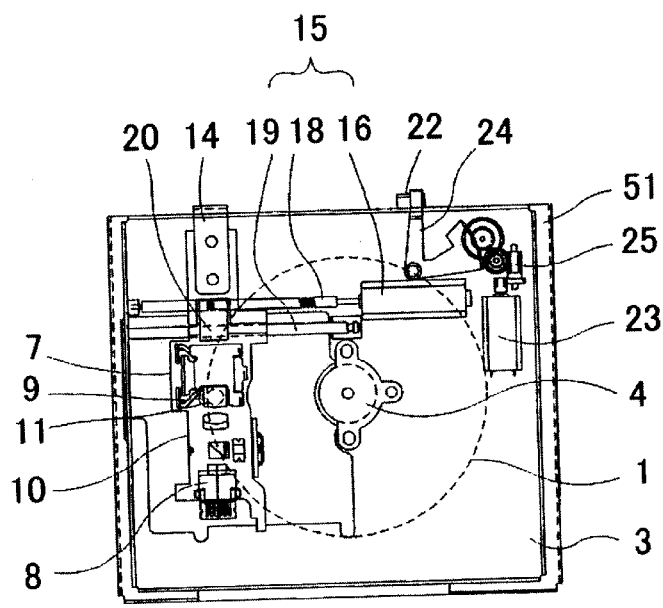
Figure 16:
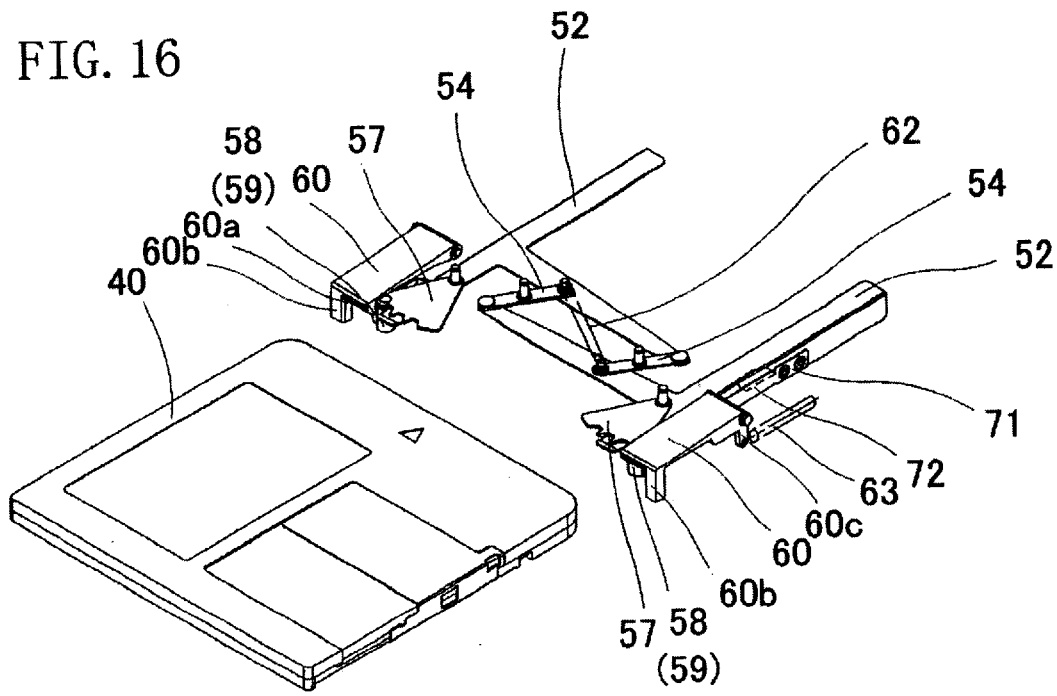
FIG. 16 is a drawing corresponding to FIG. 4 but showing instead a second embodiment of the present invention.
Figure 17:
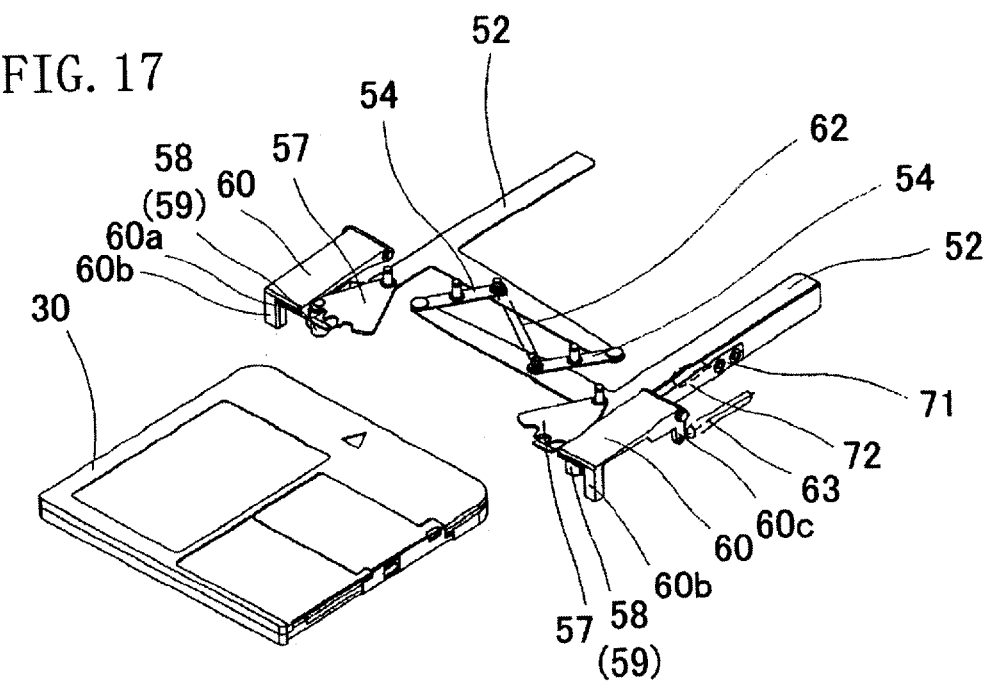
FIG. 17 is a drawing corresponding to FIG. 5 but showing instead a second embodiment of the present invention.

15(a) is a plan view of the disk device, FIG. 15(b) is a side view of the disk device, and FIG. 15(c) is a bottom view of the disk device. In addition, FIG. 16 is an oblique view showing the internal mechanism of the device when in the state shown at FIG. 13, and FIG. 17 is an oblique view showing the internal mechanism of the device when in the state shown at FIG. 14.

As shown in these respective drawings, in the present disk device the configurations of side holder(s) 52, link arm(s) 54, and drive arm(s) 57 are different from those of the foregoing first embodiment. Furthermore, width-varying mechanism(s) of the present embodiment does or do not require coupling arm(s) 56.

As in the first embodiment, side holders 52, 52 respectively have more or less L-shaped cross-sections and are arranged to the left and right at the interior of stationary holder 51. Respective left and right members of such pair of side holders 52, 52 are mutually coupled at their top surfaces by way of two parallel link arms 54, 54 so as to constitute a parallel link mechanism capable of lateral movement. Moreover, the two link arms 54, 54 are rotatably supported at their approximate centers by the foregoing stationary holder 51. By changing ratio(s) between such pivot point(s) of link arm(s) 54 and location(s) at which it or they is or are coupled to left and/or right side holder(s) 52, it is possible to change the size of the variable range over which such pair of left and right side holders 52, 52 is capable of operating.

Figure 19:
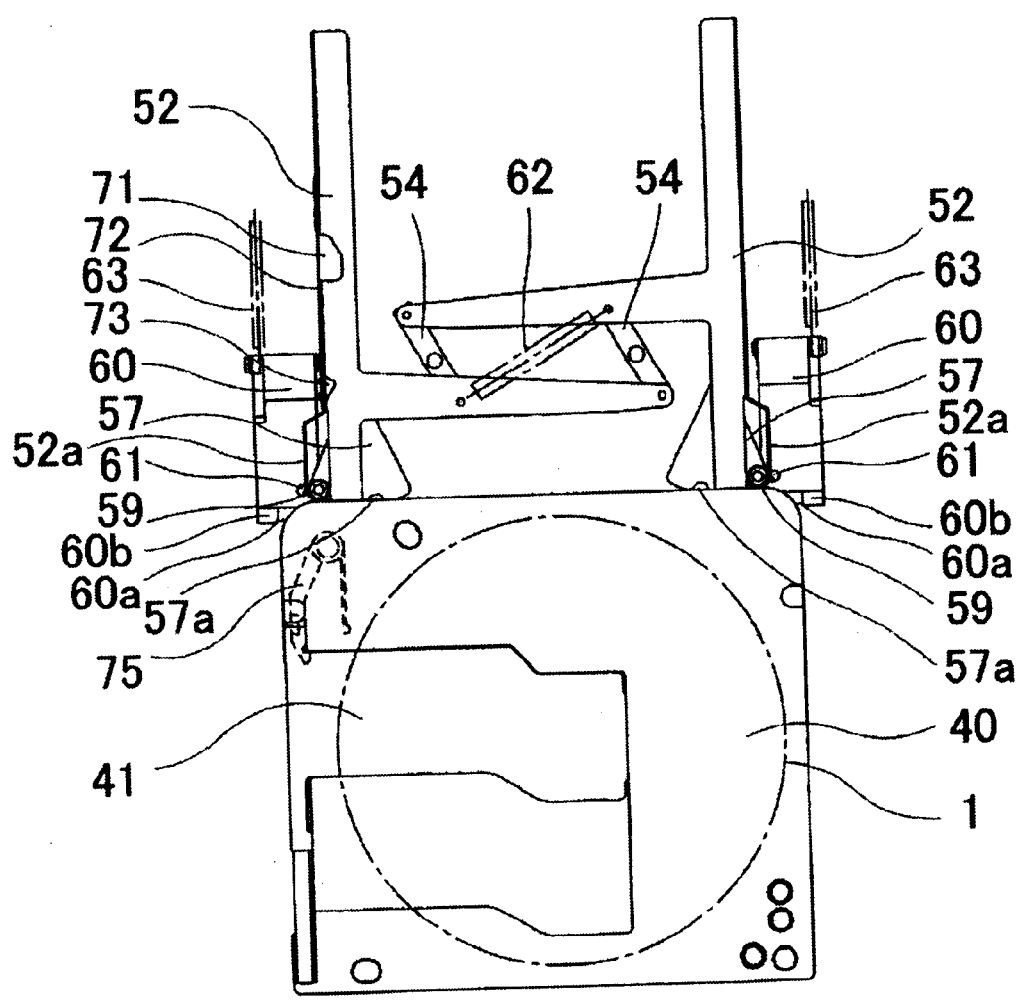
FIG. 19 is a drawing corresponding to FIG. 6 but showing instead a second embodiment of the present invention.

Furthermore, as shown in FIG. 19, stepped regions 52a may be provided on the foregoing pair of left and right side holders 52, at the respective sides thereof representing a broadening in the width direction on the cartridge insertion sides thereof, free-turning rollers 59 of the foregoing functional regions 58 being capable of being captured therewithin and the force of insertion of large cartridge 40 being transmitted to stepped regions 52a, permitting the width between the foregoing pair of left and right side holders 52 to be made variable. Furthermore, each free-turning roller 59 is sandwiched and captured between the top surface of the foregoing side holder 52 and stepped region 52a of side holder 52 such that the entirety moves as a single body, so that when one side holder 52 is made to move outward through action of one drive arm 57, the other drive arm 57 is likewise driven at the side holder 52 on the other side.

Next, blocking mechanism(s) which may be present in the present embodiment will be described. A pair of blocking levers 60, one at left and one at right, are provided so as to be capable of being pressed on by cartridge(s) at locations which are beyond the span of the width of the smallest cartridge 30 but which are within the span of the width of a different cartridge 40. Blocking levers 60 are rotatably retained by the top portion of the interior of stationary holder 51, i.e., at locations above cartridge 40, such that they can swing back and forth in the cartridge thickness direction. Moreover, restoring force(s) from spring(s) 63 act thereon in the cartridge 40 direction.

Provided at blocking lever(s) 60 are blocking lever functional region(s) 60a, located at the cartridge insertion side thereof so as to permit displacement upward from the cartridge when acted on by force(s) from cartridge 40; blocking pin(s) 61, disposed so as to prevent rotation of the foregoing drive arm(s) 57; guide region(s) 60b, for defining the inserted location of large cartridge 40; and spring catch (es) 60c, to which the foregoing spring(s) 63 is or are attached.

Provided at several locations on the foregoing drive arm(s) 57 are notches 57a capable of engaging with the foregoing blocking pin(s) 61, even after rotation of drive arm(s) 57 and even at region(s) thereof not abutting blocking pin(s) 61, when no cartridge 30, 40 is inserted therein.

Referring to FIGS. 18 through 22 and assuming a construction as described above, the situation existing during insertion of large cartridge 40 will be described.

Figure 18:
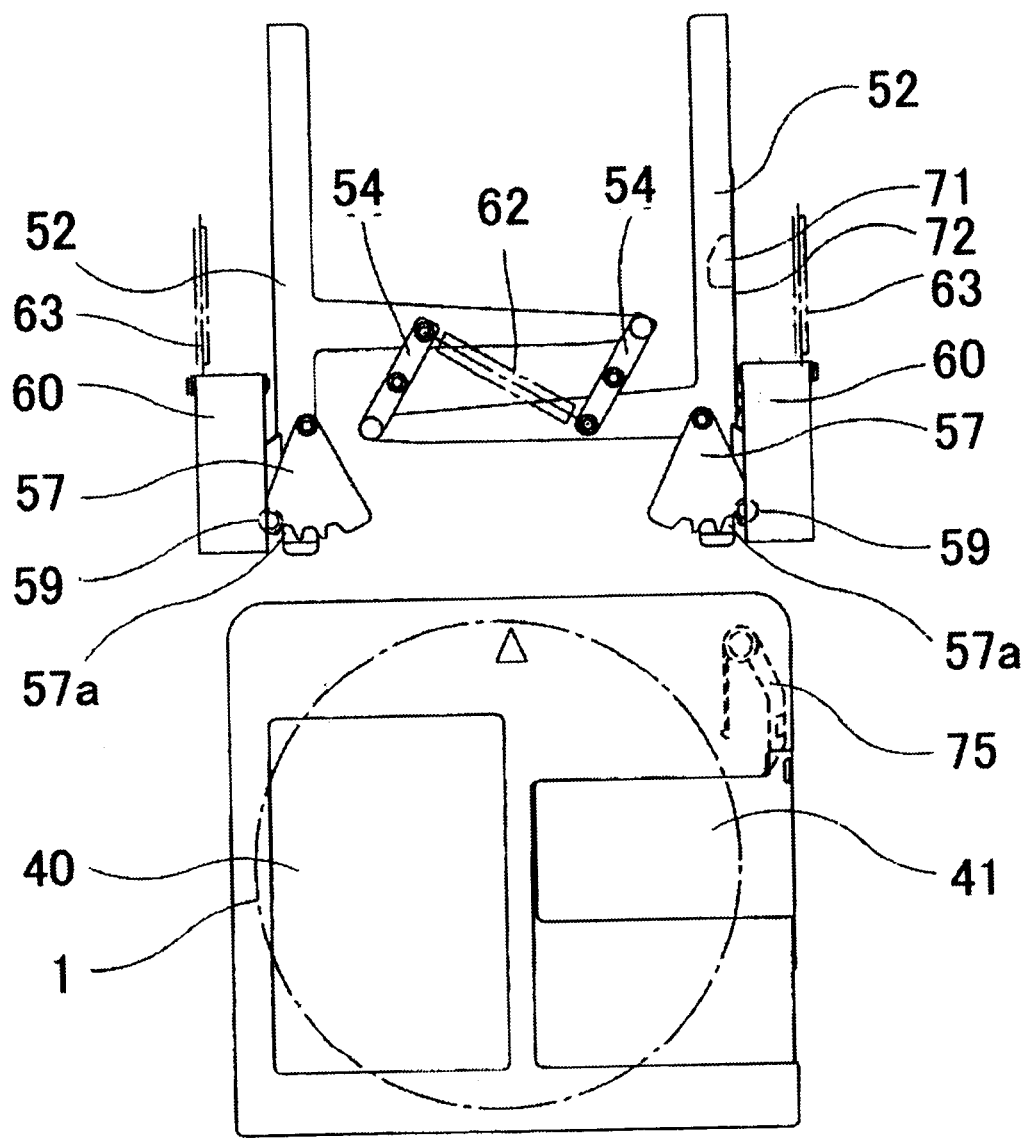
FIG. 18 is a plan view showing a width-varying mechanism in a second embodiment of the present invention.
Figure 21:
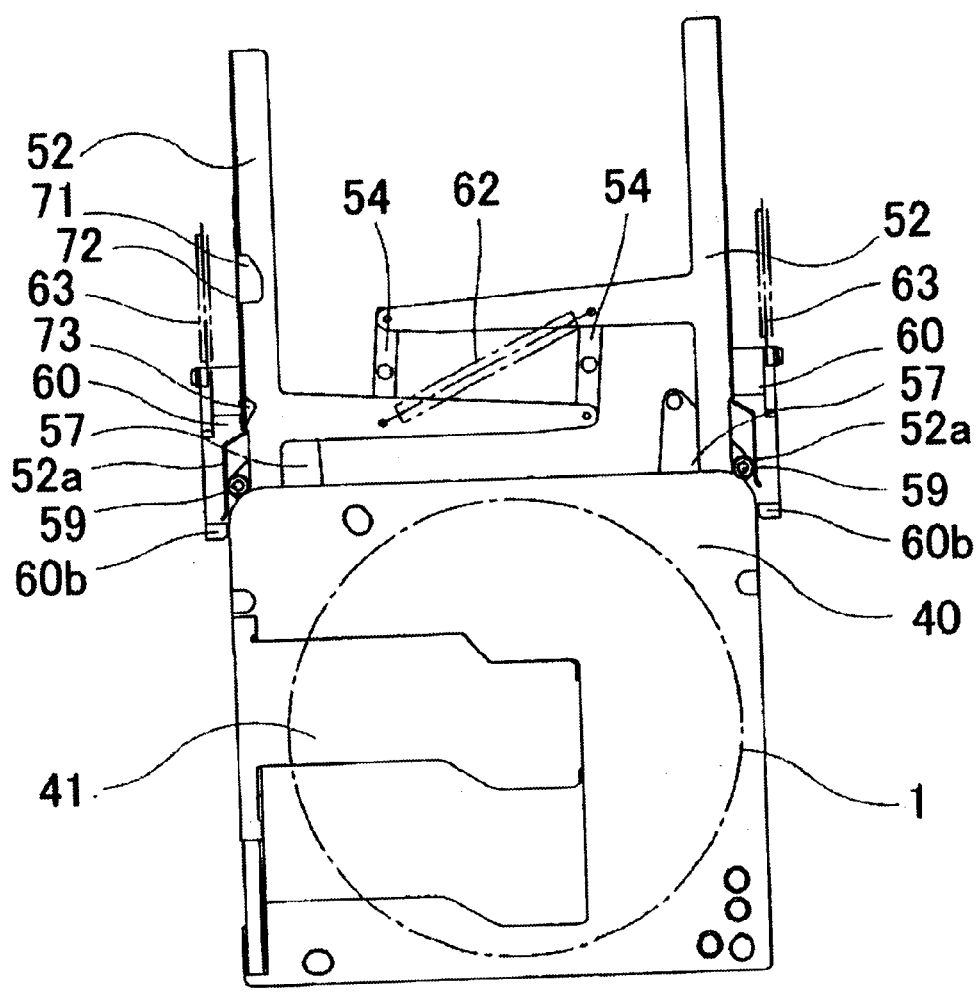
FIG. 21 is a drawing corresponding to FIG. 7 but showing instead a second embodiment of the present invention.
Figure 22:
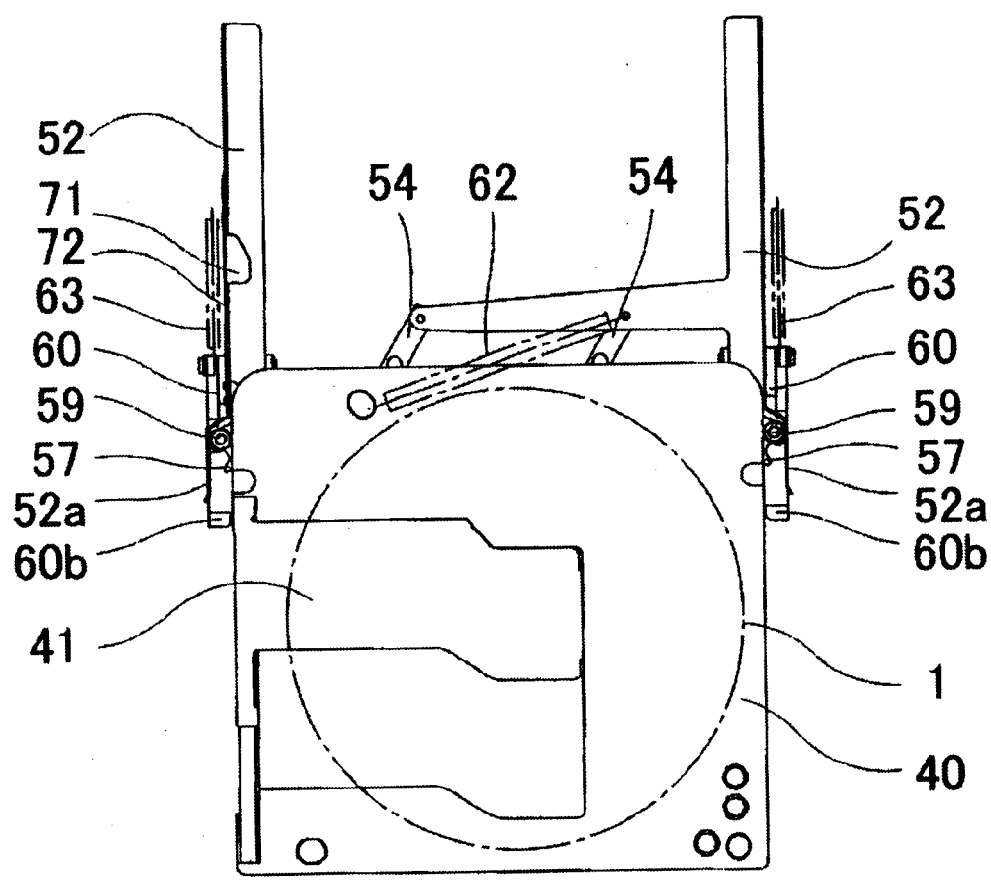
FIG. 22 is a drawing corresponding to FIG. 8 but showing instead a second embodiment of the present invention.
Figure 23:
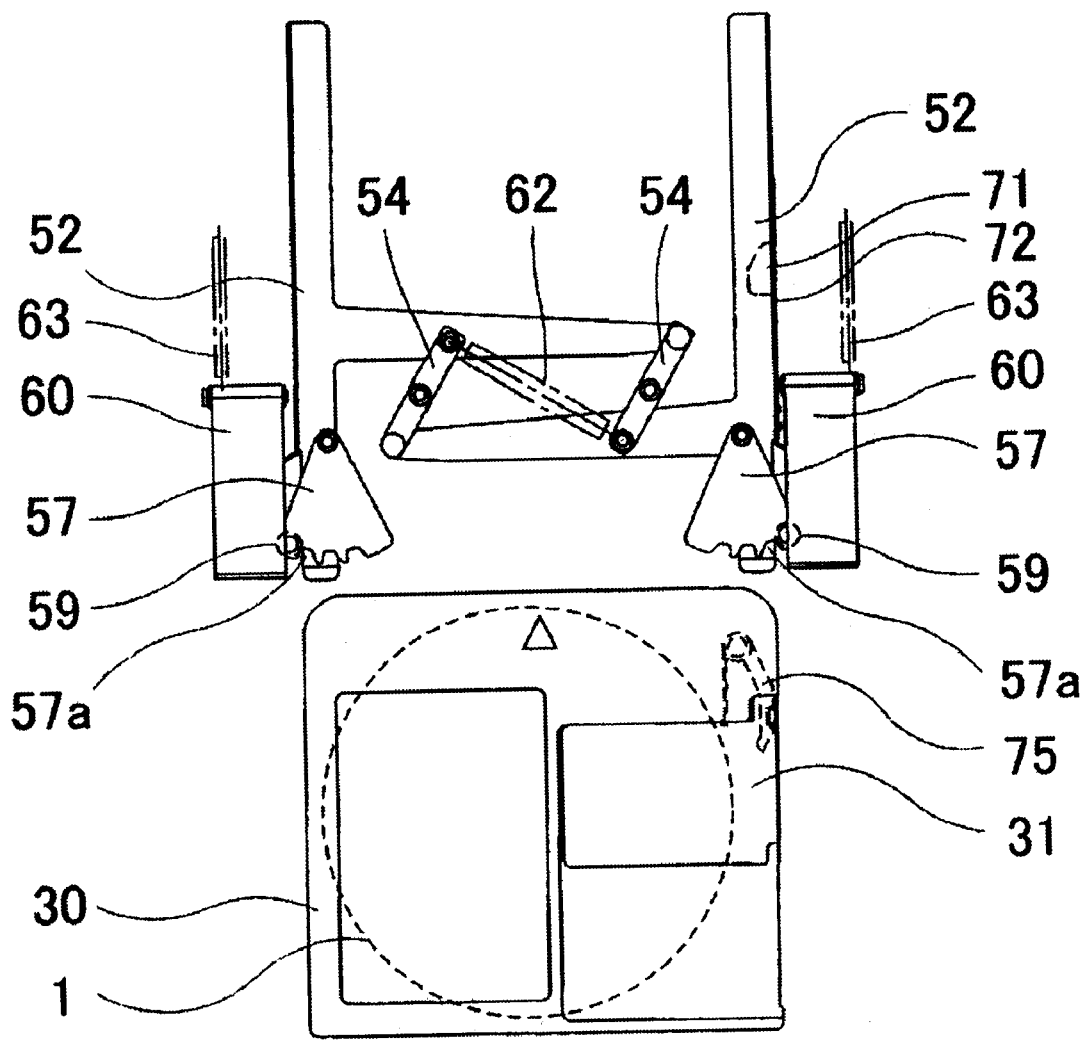
FIG. 23 is a drawing for assisting in describing operation during insertion of a small cartridge.

FIG. 18 is drawing of that portion of FIG. 16 which contains the link mechanism, shown as viewed from above the cartridge. FIG. 19, FIG. 21, and FIG. 22 are diagrammatic illustrations showing the cartridge as it is successively inserted further therein relative to the state shown at FIG. 18, these drawings however showing the situation as viewed from the back side of FIG. 18 for ease of description.

Figure 20:
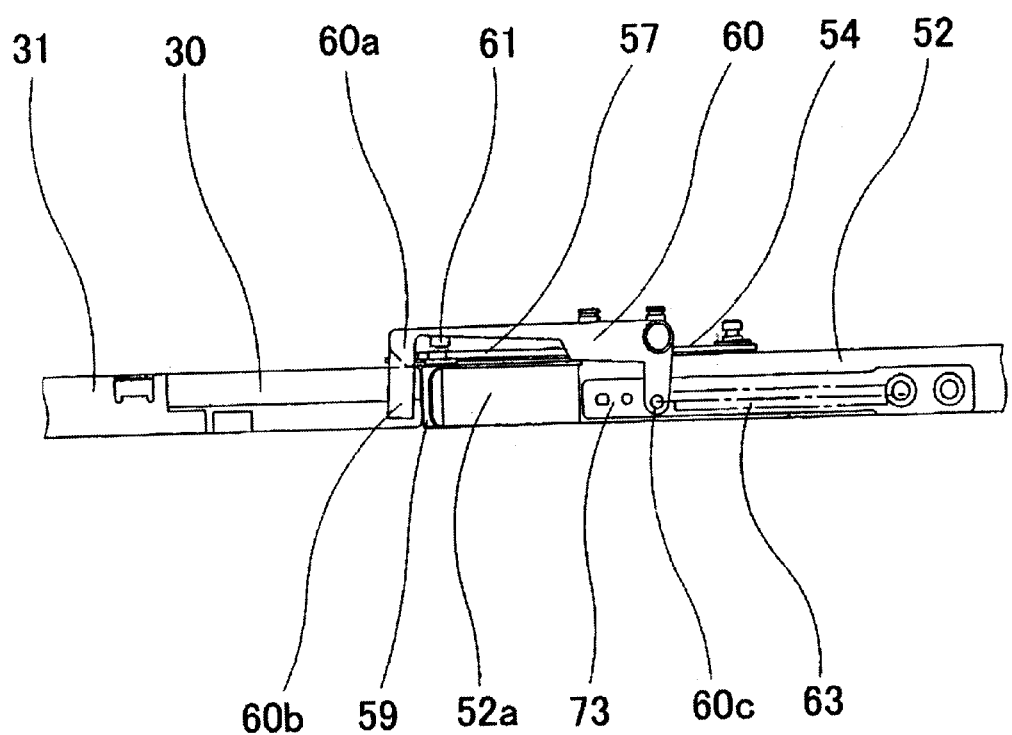
FIG. 20 is a side view showing the situation that exists during insertion of a cartridge.

FIG. 19 is a drawing showing large cartridge 40 as it just beginning to be inserted into variable cartridge holder 50, at which time large cartridge 40 presses on blocking lever functional region(s) 60a, releasing blocking levers 60. A side view of this situation is shown at FIG. 20. Because as shown in the drawings, blocking lever(s) 60 is or are released at the top of large cartridge 40, blocking pin(s) 61, which is or are capable of blocking rotation of drive arm(s) 57, disengages or disengage from drive arm(s) 57, permitting rotation of drive arm(s) 57. In addition, blocking lever guide region(s) 60b serve as guide(s) during insertion of large cartridge 40.

FIG. 21 is a drawing showing the situation when large cartridge 40 is pushed still further thereinto. The front edge of large cartridge 40 pushes on free-turning roller(s) 59, free-turning roller(s) 59 pushes or push on side holder stepped region(s) 52a, and side holder(s) 52—the left and right of which are coupled by parallel link(s)—opens or open out to the left and right.

Moreover, when free-turning roller(s) 59 moves or move to the side(s) of large cartridge 40, the width between side holders 52 has just reached the width of large cartridge 40, and expansion of the space therebetween stops.

When the device is in this state, free-turning roller(s) 59 is or are captured by side holder step(s) 52a, and because such step(s) is or are fashioned such that the size(s) thereof is or are somewhat smaller than the diameter(s) of free-turning roller(s) 59, side pressure from restoring force delivery means 62 urging side holder(s) 52 to move in a direction such as will decrease the distance therebetween acts on the side surfaces of large cartridge 40, being transmitted thereto from side holder steps 52a by way of free-turning rollers 59, so that large cartridge 40 does not directly receive side pressure from side holders 52. This permits insertion to be accomplished with little exertion of force.

Figure 24:
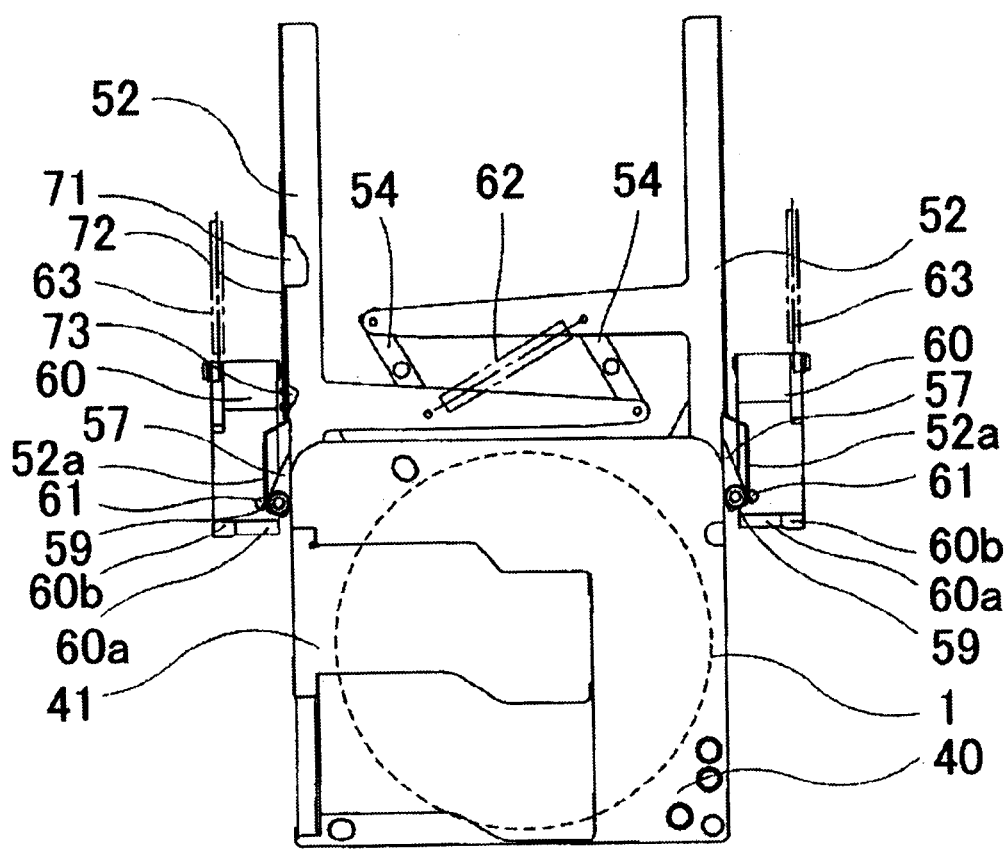
FIG. 24 is a drawing corresponding to FIG. 9 but showing instead a second embodiment of the present invention.

The situation existing during insertion of small cartridge 30 will now be described with reference to FIG. 24. This drawing is also a view from behind. In the drawing, side holders 52 have come to rest with the space therebetween having been contracted due to restoring force delivery means 62, which acts in a direction such as will cause contraction thereof, and the distance between the foregoing free-turning rollers 59 is more or less equal to the size of small cartridge 30. For this reason, with the device in that state, small cartridge 30 need only be inserted therein such that it is aligned with the space between free-turning rollers 59. Because free-turning rollers 59 are prevented from moving by blocking mechanism(s), small cartridge 30 is prevented from being inserted at a mistaken location.

Figure 25:
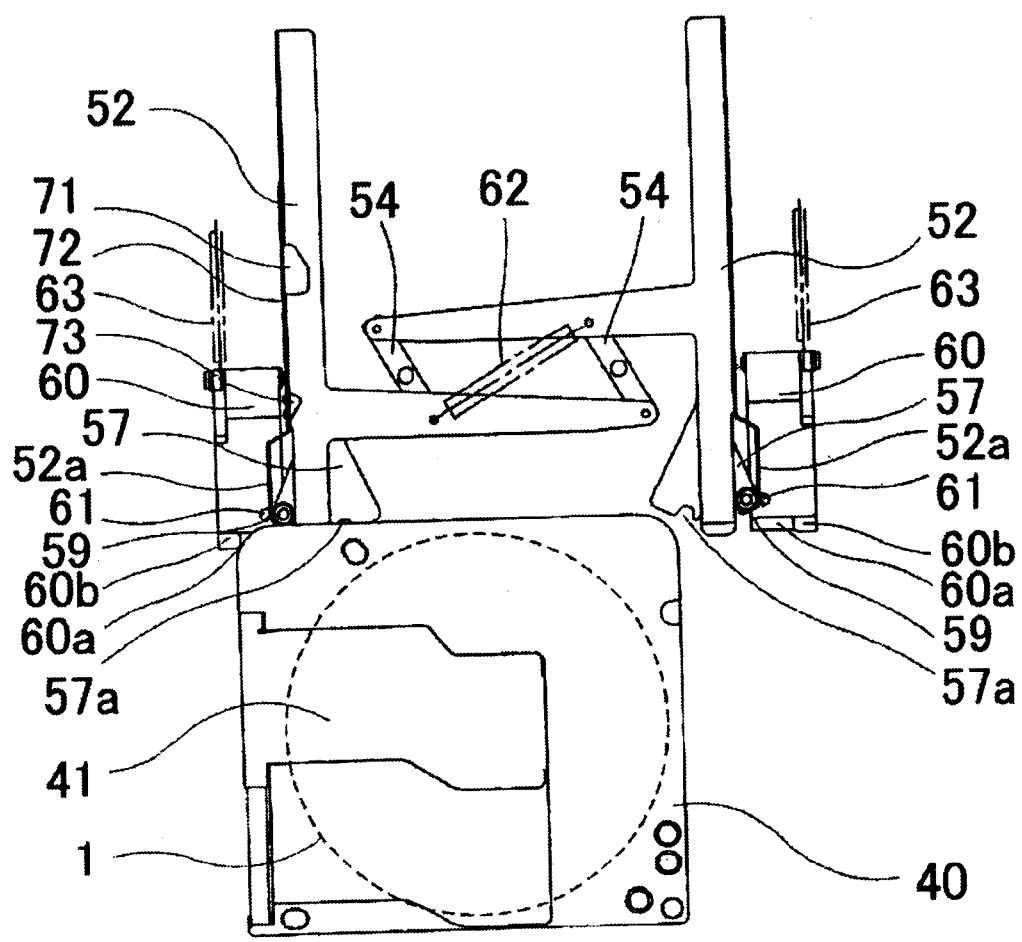
FIG. 25 is a drawing corresponding to FIG. 10 but showing instead a second embodiment of the present invention.

Next, referring to FIGS. 25 and 26, operation of blocking mechanism(s) will be described. FIG. 25 is also a view from behind. Let us assume that small cartridge 30 has been inserted such that it is off-center and to one side. As was the case during insertion of large cartridge 40, blocking lever(s) 60 is or are released by the top of small cartridge 30, but because such release occurs on only one side, such release does not occur on the other side. As described above, side holder(s) 52 and drive arm(s) 57 operate as a single body, and because the left and right members of side holders 52 are coupled by link arms 54, the construction is such that movement does not occur unless the blocking action is released at both sides. With only the blocking lever 60 at one side released, small cartridge 30 is therefore unable to push free-turning roller(s) 59 more deeply thereinto, as a result of which faulty insertion is prevented.

Figure 26:
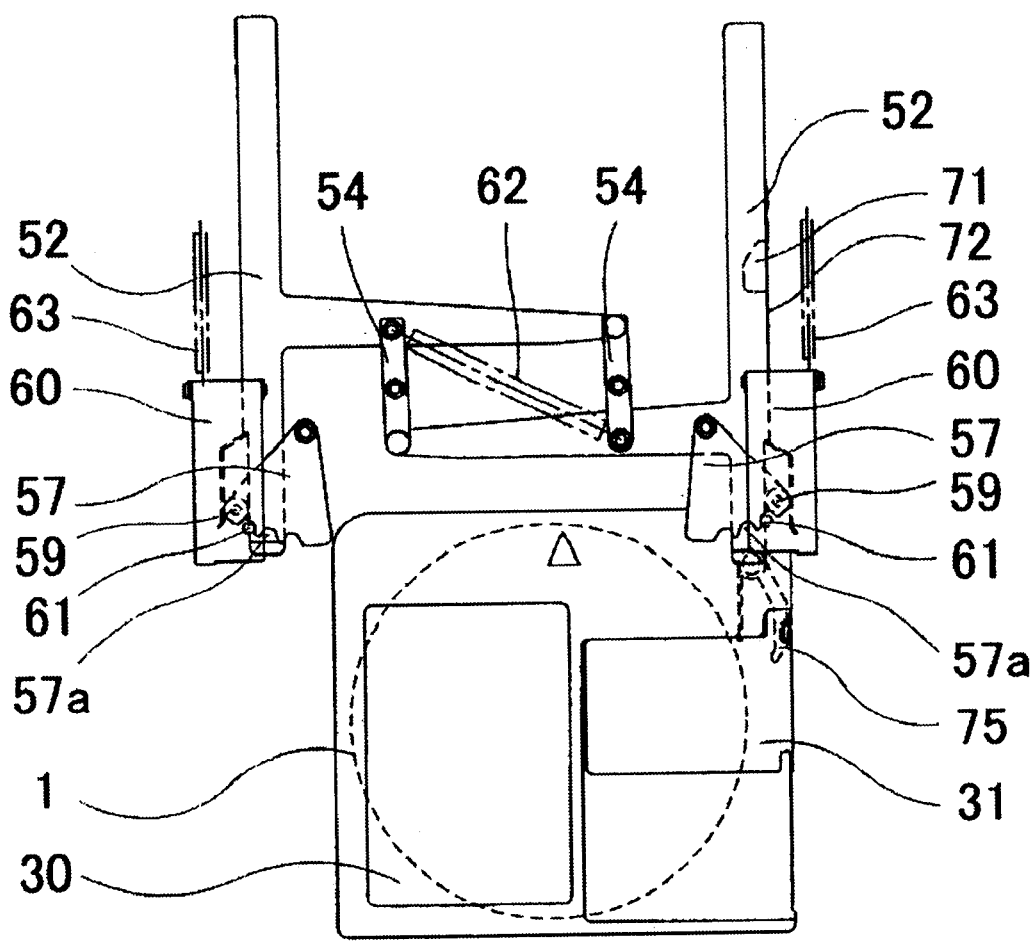
FIG. 26 is a drawing for assisting in describing actuation of a blocking mechanism in a second embodiment of the present invention.

Furthermore, even if at the time of insertion both hands are used to intentionally release blocking levers 60 at both sides while pushing small cartridge 30 into the device, because disengagement of blocking lever(s) 60 during mid-insertion will cause blocking pin(s) 61 to again engage with notch(es) 57a on drive arm(s) 57, at some point during insertion it will become impossible to push free-turning roller(s) 59 more deeply thereinto, permitting mid-insertion prevention of faulty insertion (see FIG. 26).

Other Embodiments

Whereas the foregoing embodiments have been described in terms of an example in which the present invention is applied to a magneto-optical disk recording and playback device, the present invention may also be applied to other disk devices.

The present invention may be embodied in a wide variety of forms other than those presented herein without departing from the spirit or essential characteristics thereof. The foregoing embodiments, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are moreover within the scope of the present invention.

The present application claims right of benefit of prior filing date of Japanese Patent Application No. 2002-000657, filed Jan. 7, 2002, entitled "Disk Device," the content of which is incorporated herein by reference in its entirety. Furthermore, all references cited in the present specification are specifically incorporated herein by reference in their entirety.

What is claimed is:

1. A disk device having an insertion space for insertion of one or more cartridges, the insertion space being capable of accepting insertion of a plurality of types of cartridge of different size, the disk device being characterized in that includes:
   at least one pair of holding members, one at the left and one at the right, each possessing at least one retractable mechanism capable of moving in the insertion space width direction, this width direction being more or less perpendicular to a direction of insertion of at least one of the cartridge or cartridges; and
   one or more width-varying mechanisms, each width varying mechanism causing the left and the right members of at least one of the pair or pairs of holding members to move in linked fashion in the insertion space width direction in correspondence to at least one width direction dimension of at least one of the cartridge or cartridges being inserted therein, such linked fashion movement being responsive to insertion into the insertion space of one of the plurality of types of cartridges that is larger than a smallest insertion width.

2. A disk device according to claim 1 wherein:
   at least one of the width-varying mechanism or mechanisms is equipped with at least one pair of retractable means, one said retractable means at the left and one said retractable means at the right, disposed in correspondence to at least two of the respective holding members, and with at least one pair of drive mechanisms, one at the left and one at the right, each of which is capable of being pressed on by and receiving at least one pressing force from at least a region at or near the front of the inserted end of at least one of the cartridge or cartridges when it or they is or are inserted into the insertion space;
   at least one of the drive mechanism or mechanisms which is located at one side of the insertion space width direction being coupled by one or more coupling means to at least one of the retractable means which is located at the other side thereof, and at least one of the drive mechanism or mechanisms which is located at the other side thereof being coupled by one or more coupling means to at least one of the retractable means which is located at the one side thereof.

3. A disk device according to claim 2 wherein:
   at least one of the holding members and at least one of the retractable means constitute at least two independent parallel link mechanisms, one for each the left and the right members of the at least one of the pair or pairs of holding members, capable of causing at least one of the holding members to move in at least one insertion space width direction responsive to the insertion of the at least one of the cartridge or cartridges.

4. A disk device according to claim 1 further comprising:
   one or more stationary holders which is or are capable of retaining at least one of the width-varying mechanisms;
   at least one of the retractable mechanisms constituting a parallel link mechanism which is such that respective members of at least one of the pair or pairs of holding members are mutually coupled by two or more parallel linking members, at least two of the linking members being rotatably supported at their approximate centers by at least one of the stationary holder or holders.

5. A disk device according to claim 4:
   at least one of the width-varying mechanism or mechanisms has at least one pair of left and right drive mechanisms, each of which is constructed such that one end thereof is rotatably supported by at least one of the stationary holder or holders and the other end thereof is provided with one or more functional regions capable of being pressed on by at least a region at or near the front end of at least one of the cartridge or cartridges being inserted therein, at least one of the pair or pairs of left and right holding members each being provided with one or more stepped regions extending in the insertion space width direction, and at least one of the functional region or regions being capable of causing at least one width dimension between at least two of the holding members to be made variable as a result of transmission of at least one force from the at least one of the cartridge or cartridges being inserted to at least one of the stepped region or regions.

6. A disk device according to any one of claims 1 through 3 wherein:
   at least one of the width-varying mechanism or mechanisms is constructed such that at least one dimension in the insertion space width direction formed by the at least two of the holding members when no cartridge is inserted therein more or less agrees with the width of the cartridge or cartridges of the type or types having a smallest width among the plurality of types of cartridge.

7. A disk device according to claim 6 further including:
one or more restoring force delivery means capable of delivering one or more restoring forces in at least a direction tending to cause a decrease in at least one dimension mutually separating the left and the right members of at least one of the pair or pairs of holding members when the inserted cartridge is withdrawn from the insertion space.

8. A disk device according to claim 6 wherein:
one or more stepped regions extending outward in the insertion space width direction is or are formed on at least one of the holding members at or near the open end of the insertion space, and
one or more reactive forces from at least one of the stepped region or regions acts or act on at least one of the drive mechanisms when operation of at least one of the width-varying mechanism or mechanisms causes at least one of the holding members to move outward in at least one insertion space width direction and at least one of the drive mechanisms presses on at least one of the stepped region or regions.

9. A disk device according to claim 8, wherein:
at least one dimension of at least one step of the at least one of the stepped region or regions formed on the at least one of the holding members is smaller than at least one corresponding dimension of the at least one of the drive mechanism or mechanisms which engages with the at least one stepped region.

10. A disk device according to claim 6 further comprising:
one or more free-turning rollers that is or are provided at one or more locations at the at least one of the drive mechanisms where the one or more free-turning rollers is or are pressed on by the at least one of the cartridge or cartridges being inserted into the insertion space.

11. A disk device according to claim 6, wherein:
the at least one of the stationary holder or holders which is capable of retaining the at least one of the width-varying mechanisms is supported by one or more base chasses so as to permit rotary motion, and
access is provided to the insertion space, making it possible to carry out insertion of the at least one of the cartridge or cartridges, when the at least one of the stationary holder or holders is in a prescribed angular position.

12. A disk device according to claim 11, wherein:
at least one type of the plurality of types of cartridge is configured such that disk diameter is approximately 60 mm or greater, at least another type of the plurality of types of cartridge is configured such that disk diameter is less than approximately 60 mm, this one type and this another type are portable-type cartridges, and the disk device is capable of accommodating these disks.

13. A disk device according to claim 6, wherein:
the disk device is configured and arranged so as to allow at least one of reading and writing to the one or more cartridges being inserted into the insertion space.

14. A disk device according to claim 2, 5, or 3 wherein:
at least one of the width-varying mechanism or mechanisms is constructed such that at least one dimension mutually separating the left and the right members of the at least one of the pair or pairs of drive mechanisms when no cartridge is inserted therein more or less agrees with the width of the cartridge or cartridges of the type or types having a smallest width among the plurality of types of cartridge.

15. A disk device according to claim 14 further including:
one or more restoring force delivery means capable of delivering one or more restoring forces in at least a direction tending to cause a decrease in at least one dimension mutually separating the left and the right members of at least one of the pair or pairs of holding members when the inserted cartridge is withdrawn from the insertion space.

16. A disk device according to claim 14 wherein:
one or more stepped regions extending outward in the insertion space width direction is or are formed on at least one of the holding members at or near the open end of the insertion space, and
one or more reactive forces from at least one of the stepped region or regions acts or act on at least one of the drive mechanisms when operation of at least one of the width-varying mechanism or mechanisms causes at least one of the holding members to move outward in the insertion space width direction and at least one of the drive mechanisms presses on at least one of the stepped region or regions.

17. A disk device according to claim 14 further comprising:
one or more free-turning rollers that is or are provided at one or more locations at the at least one of the drive mechanisms where the one or more free-turning rollers is or are pressed on by the at least one of the cartridge or cartridges being inserted into the insertion space.

18. A disk device according to claim 14, wherein:
the at least one of the stationary holder or holders which is capable of retaining the at least one of the width-varying mechanisms is supported by one or more base chasses so as to permit rotary motion, and
access is provided to the insertion space, making it possible to carry out insertion of the at least one of the cartridge or cartridges, when the at least one of the stationary holder or holders is in a prescribed angular position.

19. A disk device according to claim 14, wherein:
the disk device is configured and arranged so as to allow at least one of reading and writing to the one or more cartridges being inserted into the insertion space.

20. A disk device according to claim 2, 5, or 3 further including:
one or more blocking mechanisms, at least one of which is capable of blocking operation of the at least one of the width-varying mechanism or mechanisms in the event that only one drive mechanism of at least one pair of drive mechanisms is pressed on by at least a region at or near the front of the inserted end of the at least one of the cartridge or cartridges being inserted into the insertion space.

21. A disk device according to claim 20 wherein:
at least one of the blocking mechanism or mechanisms is provided at one or more regions at which at least one of the drive mechanisms, at least one of the retractable means, and at least one of the coupling means are coupled to each other.

22. A disk device according to claim 21, wherein:
the one or more regions at which the at least one of the retractable means and the at least one of the coupling means are coupled to each other also serves or serve as region or regions at which at least one of the retractable means and at least one of the holding members are coupled to each other.

23. A disk device according to claim 20 wherein:
at least one of the blocking mechanism or mechanisms is constructed so as to permit one or more blocking levers to be actuated to block operation of at least one of the drive mechanisms during the course of an abnormal insertion of the at least one of the cartridge or cartridges.

24. A disk device according to claim 20 wherein:
at least one of the blocking mechanism or mechanisms is constructed such that, when the at least one of the cartridge or cartridges is inserted therein with actuation occurring by virtue of a manually driven operation, actuation of the at least one of the width-varying mechanism or mechanisms is blocked when the manually driven operation is overridden.

25. A disk device according to claim 20 further including:
one or more restoring force delivery means capable of delivering one or more restoring forces in at least a direction tending to cause a decrease in at least one dimension mutually separating the left and the right members of at least one of the pair or pairs of holding members when the inserted cartridge is withdrawn form the insertion space.

26. A disk device according to claim 20, wherein:
one or more stepped regions extending outward in the insertion space width direction is or are formed on at least one of the holding members at or near the open end of the insertion space, and
one or more reactive forces from at least one of the stepped region or regions acts or act on at least one of the drive mechanisms when operation of at least one of the width-varying mechanism or mechanisms causes at least one of the holding members to move outward in at least one insertion space width direction and at least one of the drive mechanisms presses on at least one of the stepped region or regions.

27. A disk device according to claim 26, wherein:
at least one dimension of at least one step of the at least one of the stepped region or regions formed on the at least one of the holding members is smaller than at least one corresponding dimension of the at least one of the drive mechanism or mechanisms which engages with the at least one stepped region.

28. A disk device according to claim 20, further comprising:
one or more free-turning rollers that is or are provided at one or more locations at the at least one of the drive mechanisms where the one or more free-turning rollers is or are pressed on by the at least one of the cartridge or cartridges being inserted into the insertion space.

29. A disk device according to claim 20, wherein:
the at least one of the stationary holder or holders which is capable of retaining the at least one of the width-varying mechanisms is supported by one or more base chasses so as to permit rotary motion, and
access is provided to the insertion space, making it possible to carry out insertion of the at least one of the cartridge or cartridges, when the at least one of the stationary holder or holders is in a prescribed angular position.

30. A disk device according to claim 29, wherein:
at least one type of the plurality of types of cartridge is configured such that disk diameter is approximately 60 mm or greater, at least another type of the plurality of types of cartridge is configured such that disk diameter is less than approximately 60 mm, this one type and this another type are portable-type cartridges, and the disk device is capable of accommodating these disks.

31. A disk device according to claim 20, wherein:
the disk device is configured and arranged so as to allow at least one of reading and writing to the one or more cartridges being inserted into the insertion space.

32. A disk device according to any one of claims 1 through 3, further comprising:
one or more restoring force delivery means capable of delivering one or more restoring forces in at least a direction tending to cause a decrease in at least one dimension mutually separating the left and the right members of at least one of the pair or pairs of holding members when the inserted cartridge is withdrawn from the insertion space.

33. A disk device according to claim 32, wherein:
the disk device is configured and arranged so as to allow at least one of reading and writing to the one or more cartridges being inserted into the insertion space.

34. A disk device according to any one of claims 1 through 3, further comprising:
one or more free-turning rollers that is or are provided at one or more locations at the at least one of the drive mechanisms where the one or more free-turning rollers is or are pressed on by the at least one of the cartridge or cartridges being inserted into the insertion space.

35. A disk device according to claim 34, wherein:
the at least one of the stationary holder or holders which is capable of retaining the at least one of the width-varying mechanisms is supported by one or more base chasses so as to permit rotary motion, and
access is provided to the insertion space, making it possible to carry out insertion of the at least one of the cartridge or cartridges, when the at least one of the stationary holder or holders is in a prescribed angular position.

36. A disk device according to claim 35, wherein:
at least one type of the plurality of types of cartridge is configured such that disk diameter is approximately 60 mm or greater, at least another type of the plurality of types of cartridge is configured such that disk diameter is less than approximately 60 mm, this one type and this another type are portable-type cartridges, and the disk device is capable of accommodating these disks.

37. A disk device according to claim 34, wherein:
the disk device is configured and arranged so as to allow at least one of reading and writing to the one or more cartridges being inserted into the insertion space.

38. A disk device according to any one of claim 4 or 5, wherein:
the at least one of the stationary holder or holders which is capable of retaining the at least one of the width-varying mechanisms is supported by one or more base chasses so as to permit rotary motion, and
access is provided to the insertion space, making it possible to carry out insertion of the at least one of the cartridge or cartridges, when the at least one of the stationary holder or holders is in a prescribed angular position.

39. A disk device according to claim 38, wherein:
at least one type of the plurality of types of cartridge is configured such that disk diameter is approximately 60 mm or greater, at least another type of the plurality of types of cartridge is configured such that disk diameter is less than approximately 60 mm, this one type and this another type are portable-type cartridges, and the disk device is capable of accommodating these disks.

40. A disk device according to any of claims 1–3, wherein:

the disk device is configured and arranged so as to allow at least one of reading and writing to the one or more cartridges being inserted into the insertion space.

41. A disk device according to any one of claims 1 through 4 or claim 3 wherein:

one or more stepped regions extending outward in the insertion space width direction is or are formed on at least one of the holding members at or near the open end of the insertion space, and one or more reactive forces from at least one of the stepped region or regions acts or act on at least one of the drive mechanisms when operation of at least one of the width-varying mechanism or mechanisms causes at least one of the holding members to move outward in at least one insertion space width direction and at least one of the drive mechanisms presses on at least one of the stepped region or regions.

42. A disk device according to claim 41 wherein:

at least one dimension of at least one step of the at least one of the stepped region or regions formed on the at least one of the holding members is smaller than at least one corresponding dimension of the at least one of the drive mechanism or mechanisms which engages with the at least one stepped region.

43. A disk device according to claim 41, wherein:

the disk device is configured and arranged so as to allow at least one of reading and writing to the one or more cartridges being inserted into the insertion space.

* * * * *